United States Patent [19]
Menezes et al.

[11] Patent Number: 5,473,691
[45] Date of Patent: Dec. 5, 1995

[54] SYSTEM AND METHOD FOR COMPUTER DATA TRANSMISSION

[75] Inventors: Arul Menezes, Bellevue; Sharad Mathur, Redmond; Michael Ginsberg, Bellevue, all of Wash.

[73] Assignee: Microsoft Corporation, Redmond, Wash.

[21] Appl. No.: 149,265

[22] Filed: Nov. 5, 1993

[51] Int. Cl.⁶ ........................................... H04K 1/00
[52] U.S. Cl. .................. 380/25; 380/18; 358/440
[58] Field of Search .................. 380/18, 23, 24, 380/25, 48, 49, 50; 358/256

[56] References Cited

U.S. PATENT DOCUMENTS

| | | | |
|---|---|---|---|
| 4,927,349 | 5/1989 | Ogata et al. | 358/256 |
| 4,953,210 | 8/1990 | McGlynn et al. | 380/48 |
| 5,303,303 | 4/1994 | White | 380/49 |
| 5,307,413 | 4/1994 | Denzer | 380/49 |

FOREIGN PATENT DOCUMENTS

| | | |
|---|---|---|
| 0440914 | 8/1991 | European Pat. Off. . |
| 0511467 | 11/1992 | European Pat. Off. . |
| 0532209 | 3/1993 | European Pat. Off. . |
| 4015731 | 1/1992 | Japan . |

OTHER PUBLICATIONS

Network Services Desktop Reference Guide; 1988; pp. 1–6.
Tops Inbox Personal Connection For Macintosh User's Guide; 1988; pp. 1-I-5.

*Primary Examiner*—Tod R. Swann
*Attorney, Agent, or Firm*—Seed and Berry

[57] ABSTRACT

The system of the present invention processes data for communication between first and second computers by linearizing the communications message. The message comprises a linear header portion, an extended header portion, and a message body. The linear header portion identifies the number of message recipients and message types. The extended header contains detailed information about the message recipients, such as recipient name and address. The extended header may also contain message subject information, polling information, and password data. The header information is used by the receiving computer to prepare to process the expected data type. The message body may be transferred in a form that takes advantage of the data processing capabilities of the first and second computers. The computers may exchange data processing capabilities so that the most efficient transfer form may be selected. The extended header and message body are encoded using a well-known ASN-1 data encoding process. In addition, the message body may be compressed and encrypted. The system may be readily used in facsimile communication where the first and second computers are facsimile machines.

55 Claims, 11 Drawing Sheets

SYSTEM AND METHOD FOR COMPUTER DATA TRANSMISSION

TECHNICAL FIELD

The invention relates generally to a system and method for formatting and processing data, and more particularly, for formatting processing facsimile data.

BACKGROUND OF THE INVENTION

Computers are commonly used in the workplace for data processing and storage. Access to computer information is a key element in the successful use of computers. Communication between computers has become a critical aspect of access to the computer information. A local area network (LAN) allows several computers to be coupled together to enhance their computing capability. One computer can access information stored in another computer through the LAN. When information is exchanged between two computers, the information must be in a format that the computers can recognize and process. Information is often exchanged in a standard format such as ASCII, for example. However, an ASCII format exchange may require that the information be converted from its original format to ASCII format. The computer transferring information has no way of determining the data processing capabilities of the receiving computer and., therefore, must convert the information to ASCII on the assumption that ASCII is a "universal" format that all computers can recognize.

One form of computer is a facsimile (FAX) machine. A FAX machine may comprise an interface board within a computer, or may be a stand-alone device employing well-known computer technology. FAX machines are used to transfer information from one location to another. FAX machines of older design had little or no computing power and were limited to scanning a page and transmitting a digitized version of the page to a receiving FAX machine that reproduced the page. Modem FAX machines are essentially a form of computer and often have storage capability allowing the FAX machine to scan a document and store the digitized version of the machine for transmission at a later time, such as when telephone rates decrease at night. The receiving FAX machine can store received messages that are confidential and print them out only when the proper identification code is entered.

To minimize transmission time, FAX machines use data compression techniques well known in the art. An international standard for facsimile transmission has been established by the International Telegraph and Telephone Consultative Committee (CCITT) and published as *Terminal Equipment and Protocols for Telematic Services* (1989). References to CCITT standards are made throughout this disclosure. These standards are well known to those skilled in the art and will not be discussed in detail. To conform to the CCITT standard, all FAX machines have Modified Huffman (MH) encoding capability to compress that digitized data for transmission. Newer FAX machines may also employ MR or MMR encoding techniques to compress the data to a greater extent. The MH and MR data encoding are known as CCITT recommendation T.4 1-dimensional and 2-dimensional encoding, respectively, while the MMR is known as CCITT recommendation T.6 2-dimensional encoding. These data encoding techniques are well known and will not be discussed herein. It is to be understood that reference to a particular encoding capability infers that the particular FAX machine also has the ability to decode that particular data format. For example, a reference to a FAX machine with MMR encoding capability almost always means that the same FAX machine can decode MMR encoded data.

The standardized facsimile data encoding capabilities of a receiving FAX machine are automatically transmitted during what may be termed as the negotiation phase of a facsimile telephone call. The various phases of a facsimile transmission, shown in FIG. 1, are described in the CCITT standards.

Phase A, shown in FIG. 1, is the call establishment phase in which the telephonic communication is established between a calling station and a called station. The calling station is the station initiating the facsimile telephone call and the called station is the station receiving the facsimile telephone call. As is well known, both the calling station and the called station are able to transmit or receive facsimile messages.

Phase B is a pre-message procedure phase or negotiation phase for identifying and selecting facsimile data encoding capabilities between the calling station and the called station. In phase B, the receiving FAX machine transmits a digital identification signal (DIS) data frame that describes the particular data encoding formats that are recognizable to the receiving FAX machine. The individual data bits of the DIS data frame identify the particular facsimile data processing modes of the receiving FAX machine. The DIS data frame is defined by the CCITT standard and cannot be used for other purposes. As previously discussed, the capabilities include data encoding such as MH, MR, and MMR. The MH, MR, and MMR data encoding capabilities are defined within recommendation T.4 and recommendation T.6 of the CCITT standard. In addition to the identification of data encoding capabilities, the DIS data frame is used to provide information about the basic data processing capabilities of the receiving FAX machine. This may include limited information such as resolution (e.g., pixels per inch), paper sizes, and the like. These standardized facsimile data processing capabilities or modes are referred to herein as "CCITT encoding formats." The transmitting FAX machine responds with a confirming signal and selects a mutually compatible CCITT encoding format that allows the most efficient data transfer. The transmitting FAX machine encodes the data according to the selected CCITT encoding format and transmits it to the receiving FAX machine.

Phase C is the actual message transfer phase and comprises two simultaneous phases. Phase C1 is the "In-message" procedure phase, which controls the transfer of data between the transmitting FAX machine and the receiving FAX machine. This includes synchronization, error detection and correction, and line supervision. Phase C2 is the actual data transmission phase in which data is transferred by the transmitting FAX machine to the receiving FAX machine under control of the C1 phase. For simplicity, these simultaneous phases will be referred to as phase C.

Phase D is the post-message procedure phase in which information is transferred regarding the end of message signaling, confirmation signaling and end of facsimile signaling. Phase E is the call release phase in which the telephonic communication between the calling station and the called station is terminated.

The CCITT encoding formats permit basic facsimile communication. However, as with computers coupled together by a LAN, FAX machines may have data processing capabilities that can produce more efficient transmission than merely data encoding using one of the limited CCITT encoding formats. Some FAX machines are actually incorporated into computers by way of a FAX interface board. These computers may have great data processing capability, but the data processing capability cannot be called into play when transmitting or receiving a facsimile because one FAX machine does not know what data processing capabilities the other FAX machine possesses.

Presently, facsimile machines do not permit the transfer of data in a flexible manner that allows the simple addition data relating to recipients, relay instructions, file type information, and the like.

Therefore, it can be appreciated that there is a significant need for a system and method for advanced communication capabilities between computers.

SUMMARY OF THE INVENTION

The present invention is embodied in a system for controlling communication between first and second computers with the system comprising a controller controlling transfer of data between the first and second computers and a format means for formatting the data according to a predetermined format comprising a message object and a designated recipient. The message object has an object type containing the message, the message type identifying a class of the message, and message flags identifying parameters associated with the message. In one embodiment, the predetermined format includes a header containing a plurality of data fields describing parameters of the message. The parameters may include information relating to header size and message type. The plurality of headers may also comprise one of a header size data field indicating the size of the header, a message type data field indicating the type of data being transferred, a recipient number data field indicating the number of recipients of the message, and a recipient type data field indicating additional parameters of recipients. The header data field may also include a flag data field indicating the presence of encrypted data in the message as well as a flag data field indicating the presence of image data in the message.

The message object may also include at least a first attachment object, each of the attachment objects having properties identifying an attachment type and attachment data.

In another alternative embodiment, the predetermined format may include an extended header to provide detailed recipient information. The extended header contains at least a first data field and comprises one of a subject data field containing information relating to the subject of the message, a poll name data field indicating a file name if one of the first and second computers is sending a poll request, a password data field containing an authorized user identification, and a message originator data field containing data indicating the identity of the sender of the message. When the data file is transferred to at least a first recipient, the extended header may contain a message recipient data field containing a list of all recipients of the message. The message recipient data field comprises a recipient name and a recipient address.

In yet another alternative embodiment, the system for controlling communications between first and second computers comprises a transfer means to control transfer of data between the first and second computers and a linearizer for formatting the data file according to a predetermined linearized format comprising a linear header which contains information describing parameters of the data and an extended header containing information about any recipient of the data.

In addition, the linearized format may include attachment data containing a data file to be transmitted to the recipient and an attachment header describing parameters of the attachment data. The data file may be encoded using ASN-1 encoding. The data file may be compressed before transmission to the second computer. The data file may also be encrypted before transmission to the second computer.

The linear header may contain a data field containing type information about the data. The linear header may also include a data field containing a plurality of flags which are used by the linearizer to describe the parameters of the data. One of the flags may indicate the presence of encrypted data in the data. One flag may indicate the presence of image data in the data. The linear header may also include information relating to the size of the linear header.

The linear header may comprise a plurality of data fields including a size data field indicating the size of the linear header, a message type data field indicating the type of data, a recipient number data field indicating the number of message recipients, and the recipient type data field indicating additional recipient parameters.

The system may further include an extended header containing at least a first data field, the extended header data field comprising one of a subject data field containing information relating to the subject of the data, a poll name data field indicating the file name if one of the first and second computers is sending a poll request, a password data field containing an authorized user identification, and a message originator data field containing data indicating the identity of the sender of the data.

DETAILED DESCRIPTION OF THE INVENTION

Figure 1:
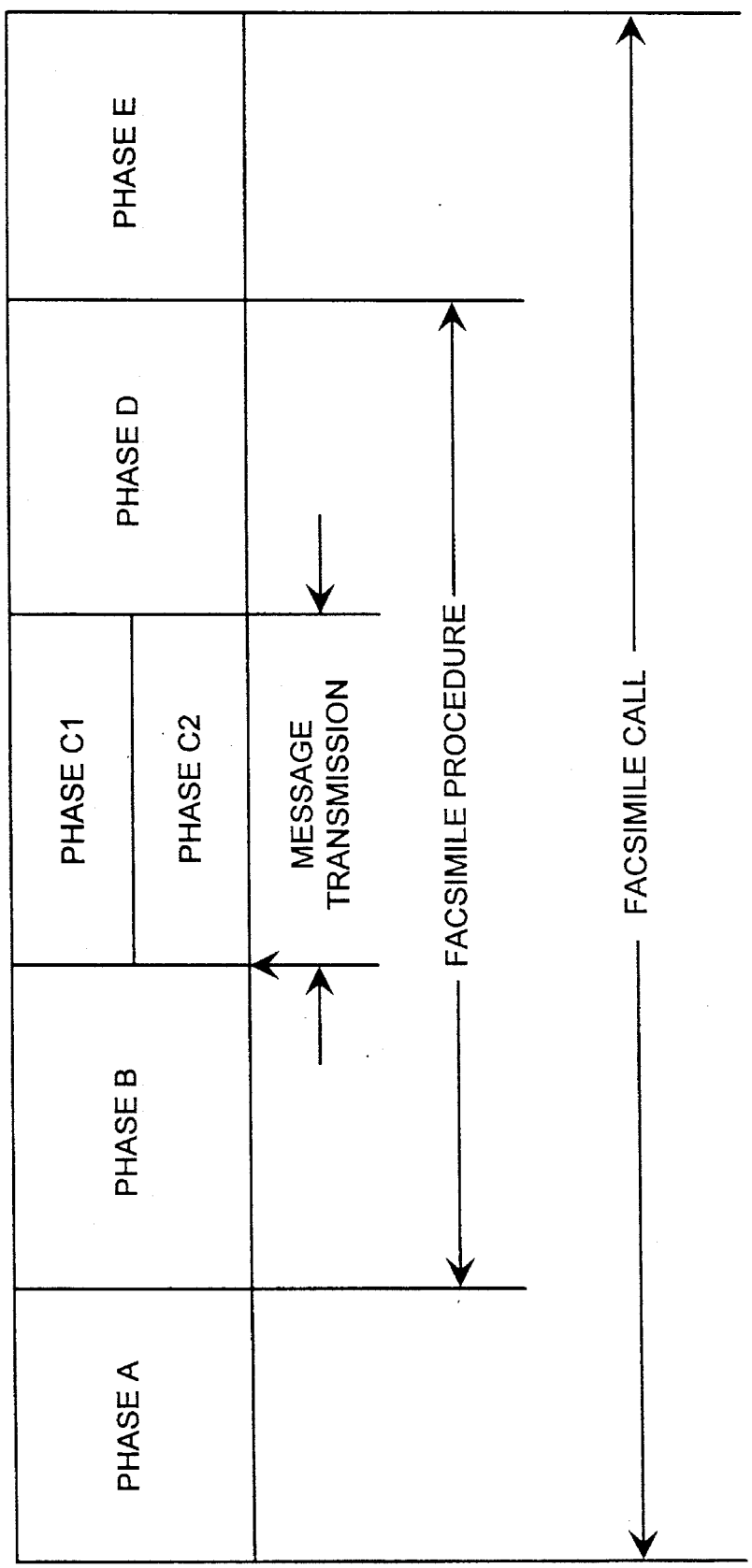
FIG. 1 illustrates the various standard phases of operation of a conventional machine.

The present invention describes a system and method for exchanging information between computers relating to the data processing capabilities of the computers. While the examples provided below are directed to capabilities exchange between FAX machines, the principles of the present invention are applicable to computers other than FAX machines.

The present invention allows the transfer of information between the receiving FAX machine and the transmitting FAX machine regarding the data processing capabilities of the respective FAX machines other than the CCITT standard formats. The FAX machine of the present invention utilizes a custom set of data processing capabilities, or custom capabilities, and a set of application data processing capabilities, or application capabilities that are associated with application programs. The CCITT standard provides the ability to transmit a non-standard facilities (NSF) data frame during the negotiation phase (phase B). The NSF data frame permits greater flexibility in the format of transmitted information. NSF data frames are sometimes used in the prior art to transmit user identification information, passwords, and facsimile relay information. The present invention uses the NSF data frame to transfer a list of the custom data processing capabilities that the receiving FAX machine has at its disposal. The custom capabilities exceed the CCITT standard encoding formats defined in the DIS data frame, and include information about imaging capabilities, polling capabilities, and the like. The custom capabilities will be discussed in detail below.

The present invention also has the ability to transfer a list of application data processing capabilities from the receiving FAX machine to the transmitting FAX machine. The application capabilities list may contain such information as the application programs available, such as would be useful if the FAX machines are interface boards in computers. For example, a computer may contain a data spreadsheet, a word processor, a sound board for voice communication, in addition to a FAX board. Application capabilities include data processing information about application programs such as the version number of the program. Application capabilities are exchanged during the data transfer phase (phase C) rather than in the negotiation phase (phase B). Furthermore, application capabilities are exchanged only upon request from the transmitting FAX machine during the data transfer phase (phase C).

The receiving FAX machine indicates the presence of application capabilities in the NSF data frame. The transmitting FAX machine receives the NSF data frame and determines whether or nor to request the application capabilities.

The present invention uses the exchanged custom and application capabilities lists to provide the data in the most appropriate format for transfer from one FAX machine to another. If the data to be transferred is in the form of a spreadsheet, the data can be transferred in that format rather than converting the data to printed pages, scanning the pages and transmitting the data using the standard facsimile data encoding capabilities. For example, the data may be in a format such as the Windows™ Printing System data format, in which data is formatted in predetermined data flames. If the receiving FAX machine has indicated that it can process Windows™ Printing System data frames, the transmitting FAX machine will send the data in that format. As can be readily seen, the ability to determine the precise capabilities of the receiving FAX machine allows the transmitting FAX machine to use the most efficient means for transferring data and permits the transfer of higher level data forms that increase the functionality of the FAX machines.

The present invention also provides a powerful data processing technique to linearize a facsimile message or messages and numerous other attachments. This permits the assembly of various components of a facsimile message into a single location for transmission.

Figure 2:
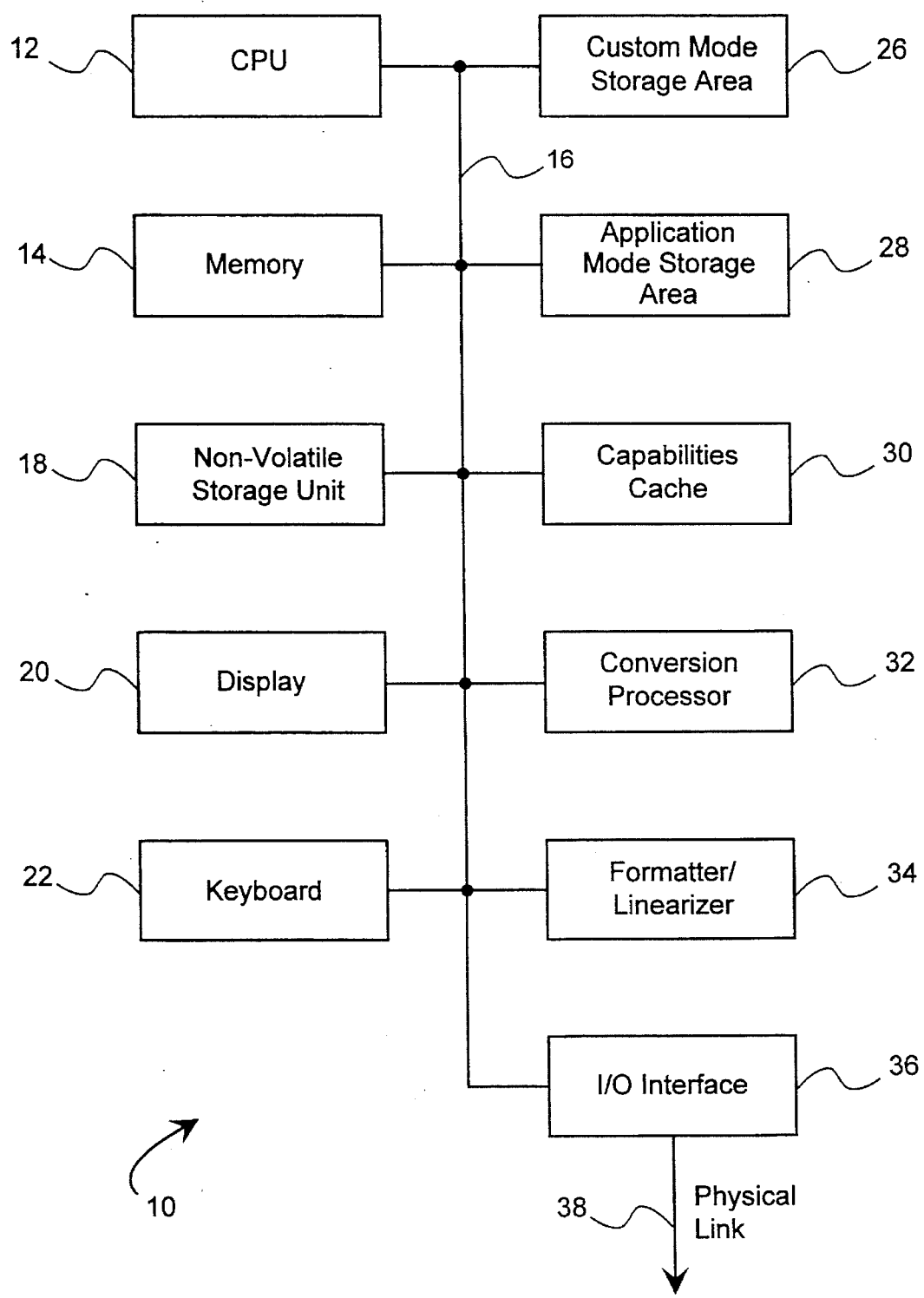
FIG. 2 is a functional block diagram of a system according to the present invention.

The present invention is embodied in a system 10, shown in block diagram form in FIG. 2. A central processing unit (CPU) 12 is coupled to a memory 14 by a bus 16. The memory 14 may comprise random access memory (RAM) and read only memory (ROM). The bus 16 may carry data signals, control signals and power to the various components of the system 10. A non-volatile storage unit 18 such as a floppy disk or a hard disk may also be coupled to the CPU 12 by the bus 16. A display 20, such as a video display, LCD display, touch-sensitive display, or other display, and a keyboard 22 are coupled to the CPU 12 by the bus 16. Not all of the above described components are required for operation according to the principles of the present invention. For example, if the system 10 is part of a FAX machine, it will be appreciated that there may not be a display 20, and the keyboard 22 may be a telephone style numeric keypad to permit the user to enter the telephone number of the FAX machine to which a facsimile message is being sent. A non-volatile storage unit 18 may also not be present if the system 10 is part of a FAX machine.

The system 10 also contains a custom mode storage area 26 which stores the custom data processing capabilities of the system. An application mode storage area 28 stores a list of application data processing capabilities of the system 10. A capabilities cache 30 stores lists of custom and application capabilities received from other systems of the present design. The capabilities cache 30 also stores a data code associated with the capabilities for each specific receiving FAX machine which is used to indicate whether the stored list accurately reflects the current capabilities of the receiving FAX machine. As will be explained below, the list of stored capabilities can be used for future communication between two systems of the present design. A conversion processor 32 processes a data file into the desired form for data transfer. Operation of the conversion processor 32 to convert a data file from one form to another is well known in the art and will not be described in detail.

A message formatter/linearizer 34 places the data file and the application capabilities list into the proper format for transfer. In the present embodiment, the data file is "linearized" by the formatter/linearizer 34. Linearization refers to the process of linking the various component of a facsimile message such as the message sender information, message recipient information, and the data file itself so that the facsimile message components may be placed in one location in the memory 14 to simplify the transmission of the facsimile message.

A message formatter/linearizer 34 places the data file and the application capabilities list into the proper format for transfer. An I/O interface 36 controls the actual transfer from the system 10 to a system of another computer. It can be appreciated that the specific form of the I/O interface 36 depends on the particular application. For example, the system 10 could be part of a FAX machine, in which case the I/O interface 36 is a facsimile modem interface. If the system 10 is part of a computer coupled to other computers on a network, the I/O interface 36 is a local area network (LAN) interface, a serial interface or the like. The present invention is not to be limited to the particular interface or environment in which the system 10 is operating. A physical link 38 couples the system 10 to another system of the same design or to a prior art system. As with the I/O interface 36, the specific form of the physical link 38 depends on the particular application. The physical link 38 may be a wire cable such as a LAN cable or a serial cable or a telephone line. However, the physical link 38 may also be a microwave link or a satellite link if the system 10 is coupled remotely to another computer. If the system 10 is part of a FAX machine, the telephone line coupling one FAX machine to another may also be a wire cable, microwave link, satellite link, or the like. The present invention is not to be limited by the specific form of the physical link 38.

Figure 3:
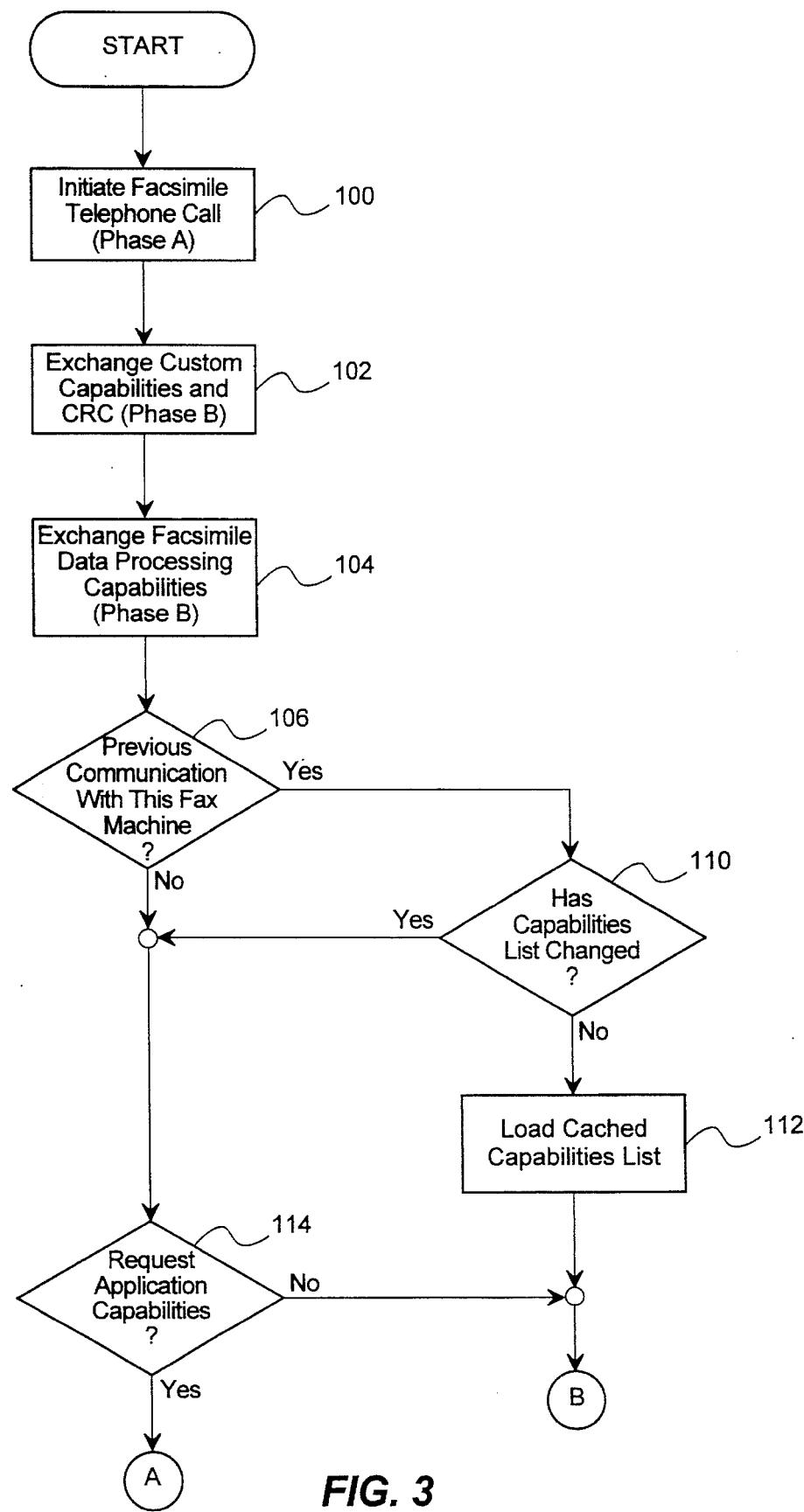
FIG. 3 is a flow chart of the operation of the system of FIG. 2.
Figure 4:
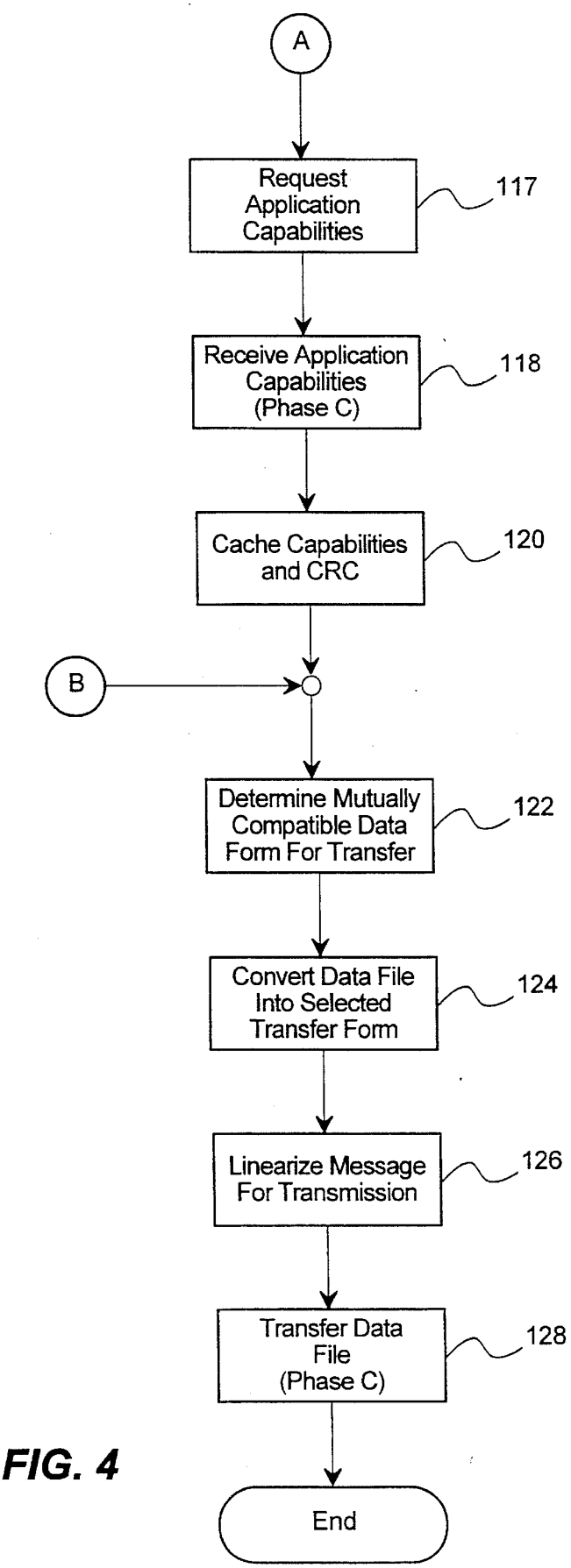
FIG. 4 is a continuation of the flow chart of FIG. 3.

The following description of operation of the system 10 shown in the flow charts of FIGS. 3 and 4 relate to a FAX machine, however, it should be appreciated that the principles of the present invention are not limited to FAX machines. The flow charts of FIGS. 3 and 4 are from the perspective of the transmitting FAX machine. The transmitting FAX machine determines the transfer form based on the data processing capabilities of the transmitting and receiving FAX machines. Alternatively, the receiving FAX machine could specify the desired transfer form based on the final data form desired by the receiving FAX machine.

When a facsimile telephone call is first initiated in step 100, shown in FIG. 3 (phase A of FIG. 1), neither the transmitting nor receiving FAX machine knows the data processing capabilities of the other. This assumes that there has been no previous communication between the transmitting and receiving FAX machines. If there had been previous communication between the transmitting and receiving FAX-machines, the custom and application capabilities would have been previously exchanged and stored in the capabilities cache 30 (see FIG. 2) of the transmitting FAX machine. If the transmitting FAX machine is initiating the facsimile telephone call, the receiving FAX machine can be identified by the facsimile telephone number. Alternatively, the FAX machines can be identified by identification data (e.g., CSI data frame) exchanged between them in a manner well known and described in the CCITT standards. The system 10 uses the negotiation phase (phase B of FIG. 1) to exchange the list of custom capabilities above and beyond the CCITT encoding formats. In step 102 the custom capabilities are exchanged using the NSF data frames. Note that the custom capabilities are stored in the custom mode storage area 26 (see FIG. 2) of the receiving FAX machine. The precise manner of custom capabilities exchange using the NSF data frames will be described below. The custom capabilities are always transmitted by the receiving FAX machine regardless of whether they are actually used or not.

A cyclic redundancy check (CRC) relating to the application capabilities is also transmitted with the custom capabilities in step 102. The user may add data processing capabilities to the system 10 from time to time, which causes the application capabilities CRC to be changed. The application capabilities CRC, which is a form of checksum, is a well-known technique for determining the validity of the stored data. When capabilities are stored in the capabilities cache 30 (see FIG. 2), the application capabilities CRC is stored with the capabilities. During a subsequent facsimile communication, the transmitting FAX machine will compare the received application capabilities CRC with the previously stored application capabilities CRC for the receiving FAX machine to determine if the cached capabilities stored within the capabilities cache 30 (see FIG. 2) are current. If the stored application capabilities CRC matches the transmitted application capabilities CRC, the capabilities stored in the capabilities cache 30 are current and may be used by the transmitting FAX machine. If the stored application capabilities CRC does not match the transmitted application capabilities CRC, the capabilities stored in the capabilities cache 30 are outdated.

The CCITT encoding formats, such as MH, MR, and MMR, are exchanged in step 102 during the negotiation phase (phase B of FIG. 1), as previously described.

In decision 106, the system 10 determines whether there has been previous communication with the receiving FAX machine. As discussed above, the system 10 can determine the identity of the receiving FAX machine from the facsimile telephone number or from the identification data exchanged between the transmitting and receiving FAX machines. If there has been no previous communication with the receiving FAX machine, the result of decision 106 is NO. If there has been previous communication with the receiving FAX machine, the result of the decision 106 is YES, and the system 10, in decision 110, determines if the capabilities lists have changed since the last facsimile communication. The capabilities lists includes both custom capabilities and application capabilities that are stored within the capabilities cache 30 (see FIG. 2). The system 10 determines whether the capabilities lists have changed by comparing the application capabilities CRC received with the custom capabilities list in step 104 with the application capabilities CRC stored in the capabilities cache 30 (see FIG. 2) for the specific receiving FAX machine.

If the capabilities lists have not changed since the previous communication with the receiving FAX machine, the result of decision 110 is NO, and the system 10 loads the cached capabilities list in step 112. If the capabilities lists have changed, the result of decision 110 is YES.

If the result of decision 106 is NO (i.e., there has been no previous communication with the receiving FAX machine) or the result of decision 110 is YES (i.e., the capabilities list has changed since the last facsimile communication), the system 10, in decision 114, determines whether to request the extended capabilities list. As previously discussed, the custom capabilities list is always sent, but the application capabilities list is only sent upon request from the transmitting FAX machine. The decision to request application capabilities depends on the capabilities of the transmitting FAX machine itself. If the transmitting FAX machine has no application capabilities, there is no need to request the application capabilities list from the receiving FAX machine. If the system 10 does request the application capabilities list, the result of decision 114 is YES, and in step 117, shown in FIG. 4, the transmitting FAX machine sends a request for the application capabilities list. In response to the request for the application capabilities list, the receiving FAX machine, in step 118, sends the application capabilities list to the system 10. Note that the application capabilities list is stored in the application mode storage area 28 (see FIG. 2) of the receiving FAX machine. If the system 10 does not request the application capabilities list, the result of decision 114 is NO. In that event, or if the system 10 has loaded the cached capabilities list in step 112, the receiving FAX machine does not send the application capabilities list to the system.

If the receiving FAX machine has sent the application capabilities list in step 118, in step 120 the system 10 caches the already received custom capabilities and the application capabilities list in the capabilities cache 30 (see FIG. 2) along with the associated application capabilities CRC. As previously indicated, the transmitting FAX machine stores both the custom capabilities list and the application capabilities list within the capabilities cache 30. Storing the custom capabilities list in the capabilities cache 30 allows the transmitting FAX machine to begin processing the data file before a facsimile telephone call is even initiated. For example, if the transmitting FAX machine has a data file formatted for 8.5"×14" paper and is instructed to send the data file to a receiving FAX machine that can only process 8.5"×11" paper, the transmitting FAX machine can use this information, which is stored in the capabilities cache 30, to begin scaling the data file for transmission in an 8.5"×11" format. Thus, the stored capabilities lists permit more efficient data processing and transfer than is possible in the prior art.

In step 122, the system 10 determines the most efficient mutually compatible data form for transfer to the receiving FAX machine. The system selects the mutually compatible data form using the application capabilities list transferred in step 118 or loaded from the capabilities cache 30 (see FIG. 2) in step 112, the custom capabilities list exchanged in step 102, or the CCITT encoding formats (MH, MR, or MMR) exchanged in step 104.

Generally speaking, the most efficient transfer form of the data file uses one or more of the custom and/or application capabilities. For example, the transmitting FAX machine may use a custom capability relating to resolution plus a custom capability relating to data compression plus an application capability relating to a particular spreadsheet application program. Thus, the most efficient transfer form of a data file may involve the use of several capabilities.

Prior art FAX machines convert the data file to one of the limited CCITT encoding formats for transmission. However, the capabilities exchange of the system 10 permits transmission in many alternative formats. If the data file is already in a form that can be processed directly by the receiving FAX machine, there is no need to convert the data file to one of the CCITT encoding formats. The data transmission itself is also more efficient because there is not a pixel-by-pixel transmission of the data file as is done with the CCITT encoding formats. The system 10 first determine whether there is a mutually compatible application capability to use as the most efficient transfer form. If there are no mutually compatible application capabilities, the system 10 will then determine whether there are common custom capabilities to use as the most efficient transfer form. The transmitting and receiving FAX machines may not have a mutually compatible data processing mode that allows a more efficient data transfer than the CCITT encoding formats. In that event, the system 10 will use one of the CCITT encoding formats.

Figure 5A:
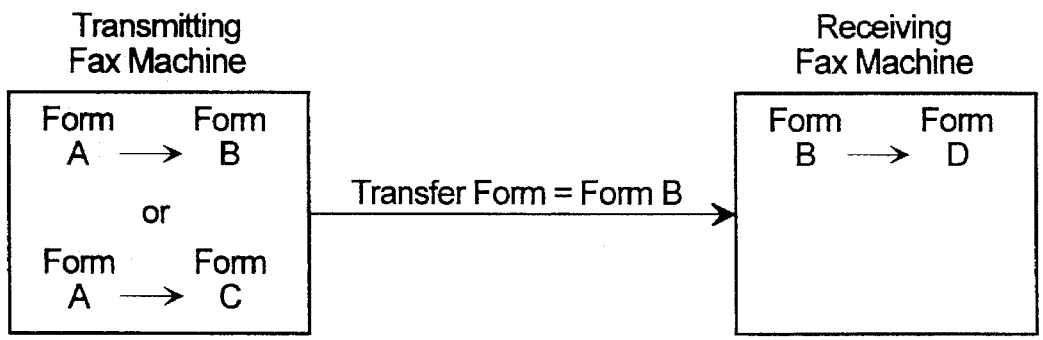
FIG. 5A illustrates conversion of a data file by the system of FIG. 2 to an intermediate transfer form.
Figure 5B:
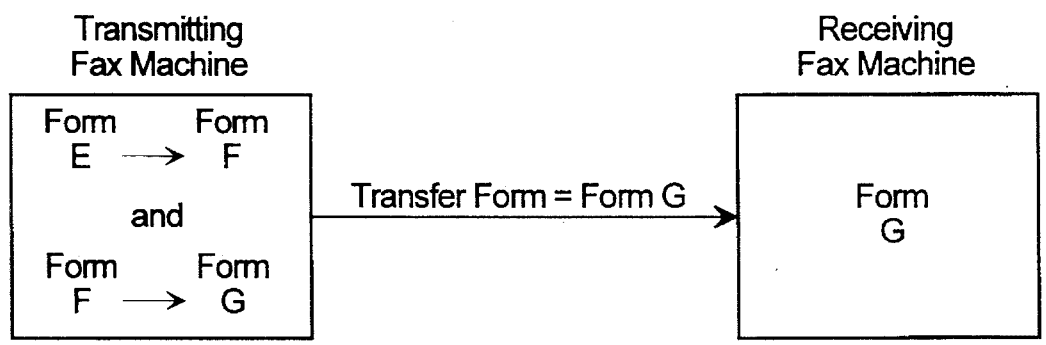
FIG. 5B illustrates multiple conversions of a data file by the system of FIG. 2 into a transfer form.

The system 10 may use an intermediate data format for the most efficient transfer of data and require that the receiving FAX machine convert the data file into a desired format after it has received the data file. For example, assume that the transmitting FAX machine has a data file stored in a particular format that we shall designate as Form A, shown in FIG. 5, and can use its custom and application capabilities to convert the data file from Form A into either of two data formats designated as Form B or Form C, and the receiving FAX machine can use its custom and application capabilities to convert the received data file only from Form B to a data format designated as Form D. The transmitting FAX machine will use its capabilities to convert the data file into Form B as the transfer form and the receiving FAX machine will use its capabilities to convert the received data file from Form B to Form D. Note that the receiving FAX machine may also process the data file in Form B without converting it to Form D. Thus, the system 10 takes the data processing abilities of the transmitting and receiving FAX machine into account when determining the most efficient transfer form for the data file. Similarly, the system 10 may convert the data file more than one time to place the data file into the desired transfer form. For example, if the receiving FAX machine can only process a data file in a format designated as Form G, as shown in FIG. 5B, and the transmitting FAX machine can render the data file from its present data format designated as Form E to a data format designated as Form F, or from Form F to Form G, the system 10 will convert the data file two separate times to place the data file into transfer Form G.

In step 124 of FIG. 4, the system 10 converts the data file into the selected transfer data form for transmission to the receiving FAX machine. In step 126, the system 10 formats the data file using a linearizing message format. The linearizing process is discussed in detail below. In step 128, the system 10 transfers the data file to the receiving FAX machine.

Custom capabilities are differentiated from application capabilities based on their expected frequency of use and the difficulty in transmitting the respective capabilities lists. For example, a particular data processing format that is frequently used would be included in the custom capabilities list, which is always exchanged. It would be inadvisable to classify a frequently used capability as an application capability because it would be requested so often that the time to request the application capabilities list and actually transfer it would exceed the time to simply exchange the list in the negotiation phase (phase B in FIG. 1). Conversely, if there is a seldom used capability, it is inadvisable to classify it as a custom capability because it is seldom used and it takes time to include it in the custom capabilities list that is always exchanged. Custom capabilities tend to be smaller in size than application capabilities. The compactness of the custom capabilities data permits the transmission of custom capabilities in NSF data frames, which have limited size. In contrast, application capabilities tend to be larger in size and are thus difficult to exchange in NSF data frames. Therefore, application capabilities are exchange in Phase C of FIG. 1. In the presently preferred embodiment, custom capabilities are updated with new revisions in the software that operates the system.

Figure 6:
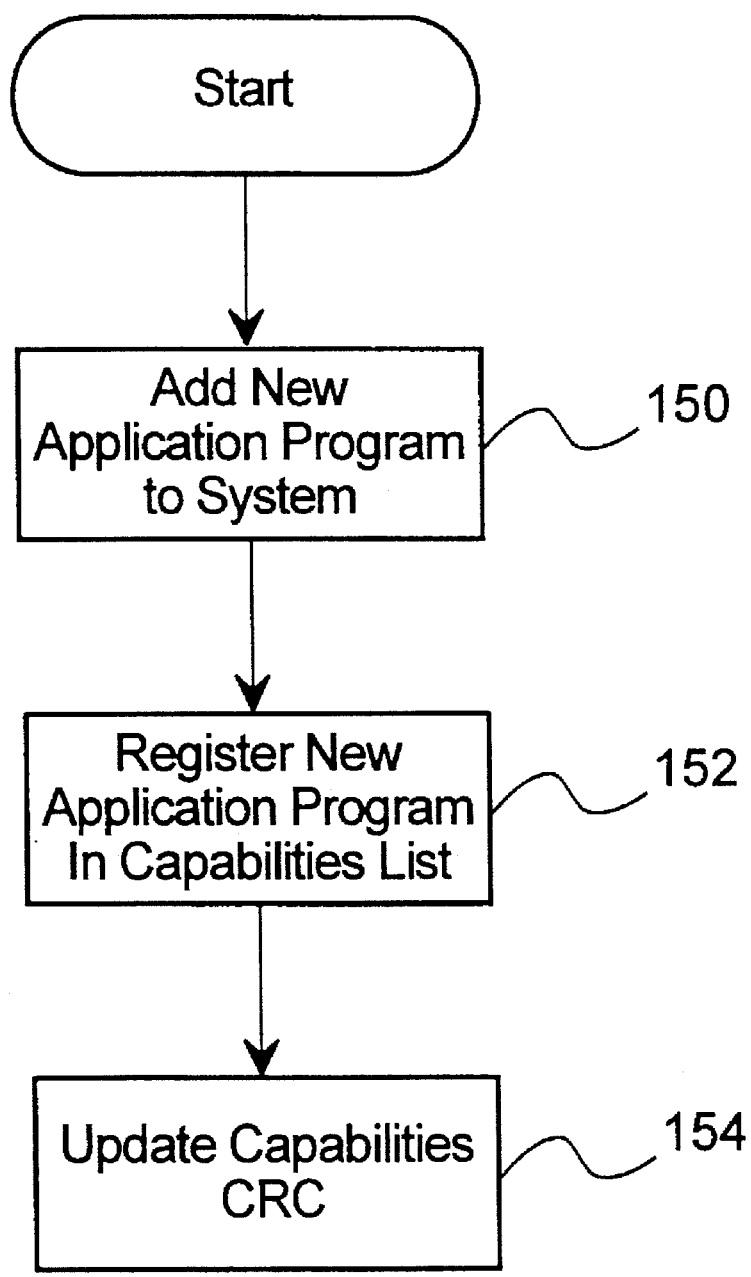
FIG. 6 is a flow chart of the registration of a new application by the system of FIG. 2.

The system 10 does provide a mechanism for an end-user to enter new capabilities into the application capabilities list. As seen in FIG. 6, the end-user adds a new application program to the system 10 in step 150. In step 152, the system 10 registers the new capability in the application capabilities list stored in the application mode storage area 28 (see FIG. 2). In step 154 the system 10 updates the application capabilities CRC, indicating a change in the capabilities.

Figure 7:
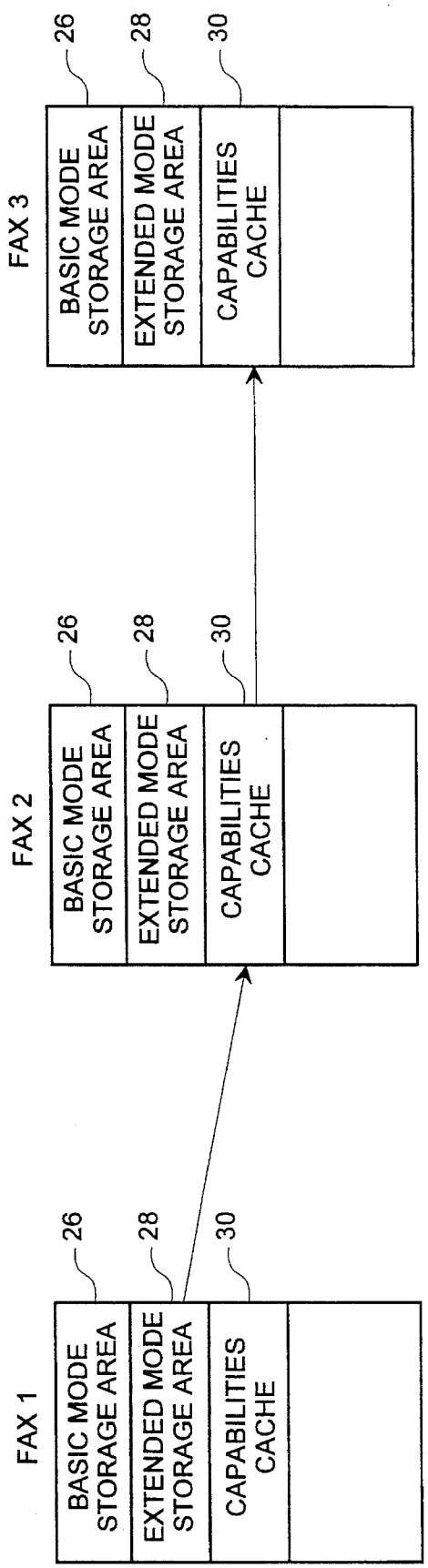
FIG. 7 is a block diagram illustrating capabilities forwarding using the system of FIG. 2.

According to the principles of the present invention, the capabilities lists can be forwarded from one FAX machine to another. As shown in FIG. 7, a first FAX machine transfers its capabilities list to a second FAX machine in the manner described above. The second FAX machine stores the capabilities lists in the capabilities cache 30 (see FIG. 2) as previously discussed. The second FAX machine, in response to a request from a third FAX machine, can forward the capabilities list for the first FAX machine from the second FAX machine's capabilities cache 30. This permits the third FAX machine to efficiently communicate with the first FAX machine without having to request the capabilities of the first FAX machine. The system 10 forwards both custom capabilities and application capabilities. There are many well known security provisions that may be included in the FAX machines to prevent the unauthorized forwarding of capabilities. The system 10 will not forward capabilities unless authorized.

As previously discussed, the system 10 uses the CCITT provisions for NSF data frames to transmit the custom capabilities list. While the communication between FAX machines conforms to the CCITT standard commands, the information and data format used by the system 10 is not known in the prior art. After a facsimile telephone call is first initiated (phase A of FIG. 1), the system 10 enters the negotiation phase (phase B of FIG. 1). The receiving FAX machine transmits an NSF data frame following the called station identification (CED) signal. According to the principles of the present inventions, the receiving FAX machine containing the system 10 transmits one or more NSF data frames indicating to the transmitting FAX machine that there are custom data processing capabilities beyond the standard facsimile data processing capabilities (i.e., beyond MH, MR, or MMR). The NSF data frames contain information describing the basic capabilities and also contains a data field indicating whether the receiving FAX machine has application capabilities. The NSF data frames also contain the application capabilities CRC described above.

The system 10 attaches the data file (or files if multiple messages are being sent) to the various messaging headers data headers and transmits the facsimile message. The headers and data file are formatted by the message formatter/linearizer 34 (see FIG. 2). Operational details of the message formatter/linearizer 34 are provided below. If the system 10 is sending a data file to a Group-3 FAX machine, the system uses the DIS data frame to construct a list of the CCITT encoding formats from the CCITT encoding formats available. If the data files to be sent are all currently in an acceptable CCITT encoding format (MH, MR, or MMR), the system 10 sends the date files in Phase C of FIG. 1.

If the system 10 is communicating with a system of the same design, the receiving FAX machine may send one or more NSF data frames containing the custom capabilities list. The DIS data frame, containing the CCITT encoding formats, is also sent at the same time. A non-standard setup (NSS) data frame is used to indicate that a facsimile message that follows is formatted according to specifications of the system 10, rather than according to the CCITT standards and the facsimile message employs one or more of the custom or application capabilities.

The system 10 also permits turnaround polling, which is well known in the prior art. With turnaround polling, the transmitting FAX machine requests that the receiving FAX machine transmit a facsimile message. If a turnaround request is transmitted, the transmitting FAX machine sends its custom capabilities list using the non-standard command (NSC) provisions of the CCITT. The format of the NSC is identical to that of the NSF. The NSC may be accompanied by a calling subscriber identification (CIG) and a digital transmit command (DTC) data frame. The DTC data frame is identical in format with the DIS data frame. On subsequent turnarounds, there is no need to exchange custom capabilities again. Therefore, only a minimal NSC is transmitted.

Custom Capabilities Formatting

The encoding scheme chosen for the custom capabilities is a compromise between compactness of data and flexibility. Custom capabilities have been divided into groups of closely related capabilities and each capability group is encoded separately. This permits easier expansion by allowing the deletion of an entire obsolete group and/or adding of new groups. A capabilities receiver in the FAX protocol level of FIG. 8 parses a received NSF data frame one group at a time and discards any unknown groups. This allows full backward and forward compatibility (i.e., systems of the present invention can exchange capabilities from other systems of the same design that have either greater or lesser capabilities. In addition, the NSF (or NSC) data frames may be encrypted by any one of a number of well known data encryption algorithms such as Digital Encryption Standard (DES). This prevents the unauthorized exchange of capabilities and facsimile messages by the system 10 and makes the capability information secure against activities such as line-tapping.

Each capability group has a uniform capability group header beginning with a GroupLength field indicating the number of bytes of the data field to follow. If the capabilities receiver does not understand this group, it can skip over the number of bytes specified in the GroupLength. The GroupLength also allows the capabilities receiver to know when one capabilities group ends and a new capabilities group begins. The GroupLength is followed by a GroupNum data field which provides a unique identification of the particular capabilities group. The remainder of any group capability structure beyond the GroupLength and GroupNum data fields has an arbitrary format and variable length (there must be a whole number of bytes). The format for each group of capabilities varies following the GroupLength and GroupNum data fields.

The format of the uniform capability header is shown in Table 1 below.

TABLE 1

```
typedef struct
{
    WORD    GroupLength    :6;    //Length of group in bytes
                                   incl. this hdr
    WORD    GroupNum       :5;    //one of the
                                   GROUPNUM_values
}
BCHDR, near* NPBCHDR, far* LPBCHDR;
```

The GroupLength field is the size, in bytes, of the capability group, including the bytes occupied by the header.

The following Capability Groups are currently defined: Standard, Identifier, Image, Polling Capabilities and Poll Request. These are described in detail below. The extensibility of this encoding scheme also allows other capability groups to be defined. The value of the GroupNum data field for the currently defined capability groups is shown below.

```
#define GROUPNUM_STD        1
#define GROUPNUM_POLLCAPS   2
#define GROUPNUM_POLLREQ    3
#define GROUPNUM_IMAGE      4
#define GROUPNUM_TEXTID     5
```

Alternatively, the capability groups could be sent in a predetermined sequence in which the GroupNum data field is not required.

The format of the Standard Capabilities Group is shown in Table 2 below.

TABLE 2

```
typedef struct
{
    WORD    GroupLength     :6;  //length of this group in bytes
    WORD    GroupNum        :5;  //must be GROUPNUM_STD
    WORD    vMsgProtocol    :3;  //version of linearized msgs accepted
    WORD    fBinaryData     :1;  //accepts binary files in linearized msgs
    WORD    fInwardRouting  :1;  //supports routing of recvd msgs
                                 //2bytes
    BYTE    vSecurity       :3;  //version of msg security supported
    BYTE    vMsgCompress    :2;  //version of msg compression supported
    BYTE    Undefined       :3;  /currently undefined/unused
                                 //3bytes
    BYTE    OperatingSys    :3;  //which host operating system
    BYTE    vShortFlags     :2;  //how short can V.21 preamble be
    BYTE    vInteractive    :3;  //version of interactive protocol supported
                                 //4bytes
    BYTE    DataSpeed       :5;  //Data modem modulations/speeds
                                 //supported
    BYTE    DataLink        :3;  //Data-link protocols supported
                                 //5bytes
}
BCSTD, near* NPBCSTD, far* LPBCSTD
```

The Standard Capabilities Group has the GroupLength and GroupNum data fields as described above. Other data fields indicate the capabilities of the system 10 and the version of software supporting those capabilities. For example, the vMsgProtocol data field indicates the availability of linearized messages and the version of the linearizer. Linearized messages will be described below. Other data fields indicate the host operating system and the support, if any, for short flags, interactive protocols, data modem modulations, and data link protocols.

The version number of various capabilities shown in the data fields in Table 1 are used to indicate the level of support for that particular capability. The data fields that follow the version prefix (a lower case v) are integers using a predefined version data field format. A 00 means that a particular capability is not supported at all. Any integer greater than 00 indicates the level of support. For example, a data value of 1 indicates the first version of the software. A data value of 2 indicates version 2, which supports all aspects of version 2 as well as version 1. Thus, the software supporting the system 10 is upward compatible. A first one of the system 10 may communicate with a second one of the system of the same design if the second system has a version number greater than or equal to the version number of the first system with respect to the particular feature.

It should be noted that the compression data field shown in Table 1 indicates the availability, if any, of data compression methods in addition to the CCITT formats (i.e., MH, MR, and MMR) for linearized messages transmitted in Phase C of FIG. 1. If this data field is 00, indicating that no additional compression capabilities are available, it does not imply that the CCITT encoding formats (i.e., MH, MR, and MMR) are not available. The CCITT encoding formats are described in the DIS, as previously discussed.

The system 10 must be able to cope with variable length data fields. All capability group structures are defined so that a data field value of 00 indicates that a particular group is not supported or is not available. This minimizes the data transmitted by only requiring as little of the group structure be transmitted as necessary. The system 10 will only transmit capabilities up to and including the last non-zero byte. The GroupLength data field is always set to the number of data bytes actually sent and includes the size of the GroupLength and GroupNum data fields. For example, if the receiving FAX machine does not support data modem modulations and data link protocol, it will send only the first four data bytes of the Standard Group to the transmitting FAX machine. The transmitting FAX machine expects a certain number of data bytes for each capability group, based on the version number of the software on the transmitting FAX machine. If an NSF is received by the transmitting FAX machine and the actual number of bytes received is less than the expected length, as indicated by the GroupLength data field, the system 10 sets the missing data bytes to 00 as if the full structure was received with those bytes explicitly set to 00. This situation may occur when the transmitting FAX machine has a higher software version number than the receiving FAX machine. Thus, the transmitting FAX machine will not use any capabilities beyond what the receiving FAX machine is capable of processing. However, if the GroupLength is greater than the length expected by the transmitting FAX machine, the transmitting FAX machine will ignore the extra bytes. This situation may occur when the receiving FAX machine has a higher software version that the transmitting FAX machine. Thus, the transmitting FAX machine will ignore any capabilities beyond those that it can process.

One of the capability group structures is the Identifier Capability Group, shown in Table 3 below.

TABLE 3

```
typedef struct
{
    WORD    GroupLength     :6;  //length of this group in bytes
    WORD    GroupNum        :5;  //must be
                                 GROUPNUM_TEXTID
    WORD    TextEncoding    :5;  //Text char set
                                 //2bytes
    BYTE    btextId[]            //var length text identifier
                                 string
}
BCTEXTID, near* NPBCTEXTID, far* LPBCTEXTID;
```

The start of the Identifier Capability Group contains the GroupLength and GroupNum data fields previously described. A text identification data field functions as a user identification and may include the name and facsimile telephone number of a remote party. The text identification is arranged so that the transmission order is the same as the left to right order of the bytes in a string as one would read them. This is opposite to the byte order of the CSI, TSI, and CIG frames specified in CCITT recommendation T.30.

A text encoding data field indicates the type of text encoding supported by the system 10. The text encoding data field is used to specify the character set of the text identification. A data value of 000 specifies basic ASCII code, and the remaining values may be used to specify other character sets such as DBCS, UNICODE, or Kanji, as well as various national-language variations of ASCII.

The system 10 also includes an Imaging Capability Group to specify advanced imaging capabilities beyond the standard CCITT recommendation T.30 imaging capabilities. The CCITT recommendation T.30 imaging capabilities are specified in the DIS data frame. The Imaging Capability Group structure is shown in Table 4 below.

time. The data fields also describe the versions, if any, of address book exchange supported, and of GDI (Microsoft® Windows™ Graphics Device Interface) Metafiles that are supported. They also describe advanced resolutions and encoding schemes, if any, supported in addition to the T.30 standard resolutions and encodings. They also describe the available cut-sheet (plain-paper) paper sizes, if any, and specify whether additional non-standard paper sizes are available. Details of these non-standard paper sizes may be obtained by requesting application capabilities, as described above. It should be noted that these parameters may vary depending on the specific FAX machine hardware attached to the system 10. For example, the system 10 may be a portion of a computer having a facsimile interface board and coupled to a laser printer. The resolution and paper size

TABLE 4

```
typedef struct
{
    WORD    GroupLength     :6; //length of this group in bytes
    WORD    GroupNum        :5; //group number--must be GROUPNUM_IMAGE
    WORD    fAnyWidth       :1; //page pixel widths don't have to be exactly T.30
    WORD    vRamboVer       :4; //version of MS resource-based printing format
                                //accepted
                                //2bytes
    BYTE    vCoverAttach    :3; //version of digital cover pages accepted
    BYTE    vAddrAttach     :2; //version of address bk attachments accepted
    BYTE    vMetaFile       :2; //version of GDI metafiles accepted
    BYTE    Undefined1      :1;
                                //3bytes
    BYTE    HiResolution    :4; //Resolutions supported in addition to T.30
    BYTE    HiEncoding      :4; //Encoding formats supported in addition to T.30
                                //4bytes
    BYTE    CutSheetSizes;      //Cut-sheet (not roll) Paper sizes supported
                                //5bytes
    BYTE    fOddCutSheet    :1; //non-standard Cut-sheet sizes also available.
    BYTE    Undefined2      :7;
                                //6bytes
}
BCIMAGE, far* LPBCIMAGE, near* NPBCIMAGE;
```

The GroupLength and GroupNum fields have been previously described. The various other data fields describe whether page widths may vary slightly from the T.30 standards or must conform exactly. Also the versions, if any, of the Microsoft® Resource-Based Printing Architecture data format that is supported, and of digital cover pages supported. Digital cover pages are rendered to a bitmap at the receiver rather than at the sender thus saving transmission parameters are governed by the laser printer coupled to the computer.

The system 10 also includes a Polling Capability Group that describes the ability of the receiving FAX machine to respond to polling requests. The group structures for the Polling Capability Group are shown in Table 5 below.

TABLE 5

```
typedef struct
{
    WORD    GroupLength         :6; //length of this group in bytes
    WORD    GroupNum            :5; //must be GROUPNUM_POLLCAPS
    WORD    fLowSpeedPoll       :1; //SEP/PWD/NSC poll reqs accepted
    WORD    fHighSpeedPoll      :1; //PhaseC pollreqs accepted
                                    //if both the above 00, poll reqs not accepted
    WORD    fPollByNameAvail    :1; //Poll-by-MessageName msgs available
    WORD    fPollByRecipAvail   :1; //Poll-by-Recipient msgs available
    WORD    fFilePolling        :1; //Supports polling for arbitrary files
                                    //2bytes
    BYTE    fAppCapsAvail       :1; //Application Capabilities available
    BYTE    fNoShortTurn        :1; //cannot recv NSC-DTC after EOM-MCF
    BYTE    vMsgRelay           :3; //Version of Message Relay support
    BYTE    Undefined           :3;
                                    //3bytes
    WORD    AppCapsCRC;             //CRC of machine's Application Capabilities
                                    //5bytes
}
BCPOLLCAPS, far* LPBCPOLLCAPS, near* NPBCPOLLCAPS;
```

As with other capability groups, the Polling Capability Group starts with a GroupLength and GroupNum data fields previously described. The Polling Capability Group also includes data fields to indicate the availability of low speed polling, high speed polling, polling by message name, polling by recipient, and polling by file name. The Polling Capability Group also has data fields to indicate the availability of application capabilities, the support (or lack of support) for Fast-Turnaround (described below), and the version of support, if any, for message relaying. The polling capabilities may be limited by security measures such as a password to prevent unauthorized access to data. The Polling Capability Group also includes a data field for the application capabilities CRC for application capabilities previously described. The value in this data field is 00 if there are no registered application capabilities.

After the recipient's capabilities have been received, the system 10 determines the optimal communication format and converts the data to be transmitted into the format. It sends the receiving FAX machine a DCS frame indicating the T.30 standard capabilities that are being invoked for this particular transmission. If it is sending a message formatted according to the linearized format it sends in addition an NSS frame. The format of the NSS frame is shown in Table 6 below.

is initiated by causing a turnaround. This is done as follows.

During T.30 operations, the transmitting FAX machine always has control of the communication line. To initiate a poll operation, the transmitting FAX machine must perform a turnaround in which the transmitting and receiving FAX machine exchange roles (i.e., the transmitting FAX machine becomes the receiving FAX machine and the receiving FAX machine becomes the transmitting FAX machine). In the T.30 standard a turnaround may be initiated immediately after receiving a DIS frame. This is adequate when a poll operation is the sole purpose of a call, however, when a poll is to be performed after a send is completed, waiting for this point in the protocol causes a delay of about 6 seconds, increasing the cost of the communications. To solve this problem, the current invention incorporates a "fast turnaround" method described below.

In the T.30 protocol, the normal sequence for turnaround following a page is EOM—MCF—T2 timeout—(NSF-)DIS—(NSC)DTC. The fast turnaround method of the system 10 makes use of the fact that the receiver's capabilities have already been received at the start of the call, and therefore there is no need to receive the DIS again. Therefore the sender sends the DTC optionally accompanied by NSC and other optional frames immediately after receiving the MCF, rather than waiting for the T2 timeout (6 seconds as

TABLE 6

```
typedef struct
{
    WORD    Group Length    :6;    //length of this group in bytes 00=grp invalid
    WORD    GroupNum        :5;    //must be GROUPNUM_NSS
    WORD    vMSGProtocol    :3;    //version of linearized msg to follow
    WORD    Undefined1      :2;
                                   //2 bytes
    BYTE    vInteractive    :3;    //version of Interactive protocol being invoked
    BYTE    Undefined2      :5;
}
BCNSS, far *LPBCNSS, near*NPBCNSS;
```

The data fields describe the version of the linearized format being invoked from the linearized message about to be transmitted, or optionally, the version of interactive protocol being invoked.

Following the DCS and NSS, if any, the communication enters Phase-C and the data is transmitted. The data may be in accordance with the T.30 encoding specifications or may be in the linearized format, as previously described. In the linearized form, the data files transmitted by the system 10 may be compressed by a number of known data compression techniques. Similarly, the data files transmitted by the system 10 may be encrypted by a number of well-known encryption algorithms.

Polling

The system 10 has advanced polling features. It allows a user to request a document or file from another of the present design using a document name or a file name. It allows users to request from another of the same design messages that have been addressed to them and are awaiting pickup. It allows Application Capabilities (previously discussed) to be requested, by the user or automatically. Polling can be completed in a call by itself or can be part of a call in which messages are first sent and then polling is initiated. Polling defined in T.30) and the DIS. Therefore the fast turnaround sequence is EOM-MCF-(NSC)DTC, which significantly reduces the turnaround time.

Polling is accomplished by the system 10 as follows. The system 10 sends one or more poll requests to the other machine. Each poll request consists of a document or message name or a file name or a recipient address, and is optionally accompanied by a password. These requests may be sent in linearized form at high speed during the Phase C part of a preceding send, in the case where a poll follows a send in a single call. In the case where there is no preceding send, the poll requests are sent during the turnaround in frames accompanying the DTC. The data fields in the frames are as follows.

Each poll request document or message name, file name or recipient address is sent in an SEP frame. If a request has an associated password, this is sent in a PWD frame immediately following the associated SEP frame. Accompanying the SEP and PWD frames, is an NSC frame. This is formatted exactly like an NSF (as described above) and contains all of the sender's capabilities. In addition, this NSC contains a Poll Request Group. The format of this group is shown in Table 7 below.

TABLE 7

```
typedef struct
    WORD    GroupLength         :6;  //length of this group in bytes 00=grp invalid
    WORD    GroupNum            :5;  //must be GROUPNUB_POLLREQ
    WORD    fReturnControl      :1;  //1=return control when done 0=hangup when done
    WORD    TurnReason          :2;  //poll request or stalling
    WORD    fAppCapsReq         :1;  //Application capabilities req
    WORD    fLowSpeedPollReq    :1;  //SEP/PWD/NSC poll req (SEP/PWD
                                     //accompanying)
                                     //2bytes
    BYTE    fHighSpeedPollReq   :1;  //PhaseC pollreq preceded this
    BYTE    fPollByNameReq      :1;  //Poll-by-MessageName req
    BYTE    fPollByRecipReq     :1;  //Poll-by-Recipient req
    BYTE    fFilePollReq        :1;  //arbitrary file poll req
    BYTE    Undeaned            :4;
                                     //3bytes
}
BCPOLLREQ, far*LPBCPOLLREQ, near*NPBCPOLLREQ;
#define TURN_POLL    0   //poll request
#define TURN_DONE    1   //request completed, control being returned
#define TURN_FAIL    2   //request failed, control being returned
#define TURN_WAIT    3   //not yet ready
```

The data fields describe whether the sender requests control of the call back after the poll has completed or whether the call should simply be terminated, also whether the NSC is being sent as part of a poll-request or as part of a stall (described below). The fields also specify whether application capabilities list is being requested, whether the poll request is contained in accompanying SEP and PWD frames (as described above) or was sent in a preceding Phase-C. The data fields also specify whether poll by document-name, poll by recipient-name and/or poll by file name are being invoked.

In response to this turnaround, the receiving FAX machine assumes the role of transmitting FAX Machine and transmits the requested information (application capabilities, poll-messages, and/or data files). The system 10 takes appropriate precautionary security measures, such as verifying passwords, before responding to turnaround operations.

It is often the case that when a poll request is made, the FAX machine being polled requires some time to locate, retrieve and appropriately format the document, message or file being polled. The T.30 standard makes no provision for this. If a poll response is not received within a limited period of time following turnaround, the connection times out and is terminated. The current invention incorporates a means for a pollee to "stall" the poller while it is retrieving polled data. While applicable to polling the stall mechanism is more generally applicable to all phases and functions of the connection and may be used to stall when a delay is required under other circumstances such as acknowledgment of secure message transmission, acknowledgments of relay instructions, or the like.

A system of the current design stalls by sending a DTC frame accompanied by an NSC frame with the following format. The NSC frame in this case contains the Poll Request Group contain above. The TurnReason data field of the Group is set to the value TURN_WAIT defined above. This indicates that the pollee is processing the request and requires some more time. Upon receiving this frame the poller, a system of this design, replies with a DTC frame accompanied by an NSC which contains the Poll Request Group, and the TurnReason field is set to TURN_POLL. However, the SEP and PWD frames, if any, are not sent a second time. The poller and pollee therefore send NSC-DTC pairs (with the TurnReason field set on to TURN_POLL and TURN_WAIT, respectively) back and forth until the pollee is ready to transmit the response to the request. As a precautionary measure either side may terminate the connection at any time if the delay becomes excessively long.

Message Formatter/Linearizer

The system 10 provides a unique data structure for the data transmitted in phase C of FIG. 1, including the application capabilities and the data file facsimile message. The facsimile message itself comprises various components that include the data file and data headers. The message formatter/linearizer 34 (see FIG. 2) takes the various components of a facsimile message and creates a linearized facsimile message containing all the specified components.

Figure 8:
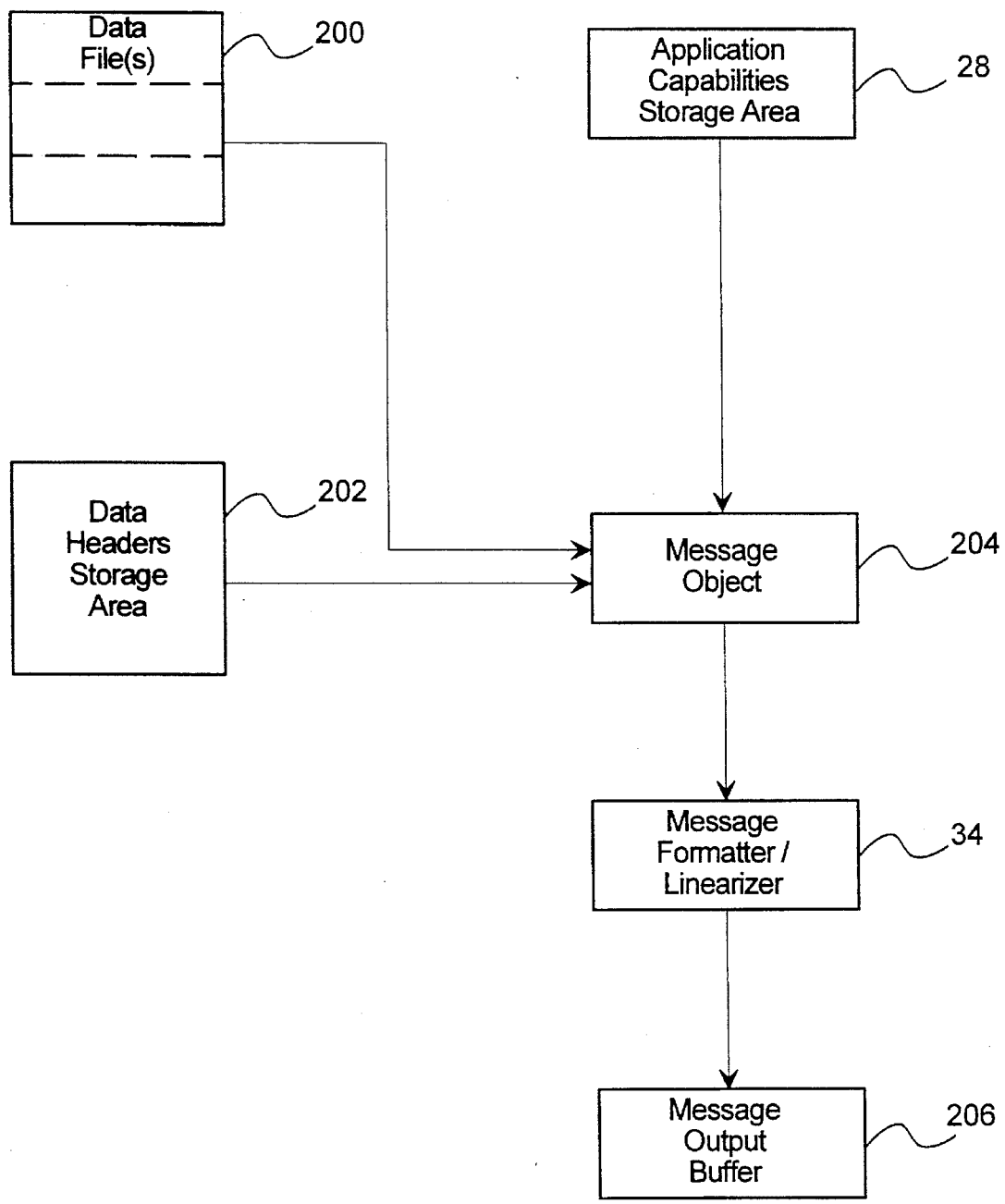
FIG. 8 is a functional block diagram of the message formatter of the system of FIG. 2.

As seen in FIG. 8, a data file storage area 200 contains the data file or files to be transmitted to the receiving FAX machine. Note that the data file storage area 200 contains one or more data files that have already been converted to the desired transfer form by the conversion processor 32, as previously discussed. Alternatively, the formatter/linearizer 34 can accept as input a data stream using the data file storage area 200 as a temporary buffer. For example, the data file storage area 200 could act as a temporary buffer for data scanned by a scan engine (not shown) and converted to the desired transfer form in real-time. Thus, the linearizer/formatter 34 does not require that an entire data file be converted into transfer form and stored in the data file storage area 200 in order to begin the process of linearization. Data headers, indicating the message recipient, recipient address, and the like, are stored in a header storage area 202. Note that the data file storage area 200 and the data header storage area 202 may be part of the memory 14 (see FIG. 2). If the FAX machine is the receiving FAX machine, the message formatter/linearizer 34 also processes the applications capabilities list in the applications capabilities storage area 28 for transmission if the transmitting FAX machine has sent a request for the applications capabilities list.

The various components of a facsimile message are stored in different areas within the FAX machine. The relationship of the various components are provided in a message object 204. The message object 204 may be part of the memory 14 (see FIG. 2). The message object 204 is provided to the message formatter/linearizer 34 and indicates to the message formatter/linearizer the location and types of all the components of the facsimile message. The message object 204 contains a pointer to a data header in the data header storage area 202, which in turn, contains a pointer to the corresponding data file in the date file storage area 200. If multiple data files are to be transmitted, the data header storage area 202 will contain a separate data header for each data file, each of which points to the corresponding data file in the data file storage area 200.

The message formatter/linearizer 34 processes the various components of the facsimile message included in the message object 204 and creates a complete facsimile message. A complete facsimile message is referred to herein as a "linearized message." The process of attaching the data file files, placing them in the proper sequence, and associating them with the appropriate headers is called linearization. The system 10 creates a linearized message containing all the necessary components of the complete facsimile message in a unique manner that permits great flexibility in facsimile messaging. The linearized facsimile message contains one or more headers that contain information identifying the type of facsimile message, the number of recipients, and the like. The complete facsimile message is stored in a message output buffer 206, which may be part of the memory 14 (see FIG. 2). The complete facsimile message is transmitted to the receiving FAX machine. As one can readily appreciate, the entire linearized facsimile message does not need to be present in the message output buffer 206 in order to begin transmission to the receiving FAX machine. Typically, the transmitting FAX machine begins transmission as soon as data becomes available in the message output buffer 206. As discussed above, the message formatter/linearizer 34 can process a data stream in real-time as the scan engine (not shown) scans the document, and the I/O interface 36 (see FIG. 2) transmits the linearized facsimile message as it is placed in the message output buffer 206 by the message formatter/linearizer 34.

The linearized facsimile message includes recipient list information and subject information. In the prior art, the user is required to manually complete a facsimile cover page with this information. In contrast, the linearized message allows marking of the linearized message for one (or more) recipients, thus permitting the system 10 to automatically route the linearized facsimile message. The transmitting FAX machine can use this information to group recipients at a single receiving FAX machine into a single group so that the transmitting FAX machine need only send one linearized facsimile message 250 to the receiving FAX machine. The receiving FAX machine can use the marking to identify the specific recipients to whom the receiving FAX machine must route the message.

The data files may be in one of a variety of transfer forms, as described above. The linearizer/formatter 34 also provides encryption capabilities to protect sensitive data. In this case, all parts of the linearized facsimile message connected with the data files are encrypted using any of a variety of well known data encryption algorithms, such as DES.

Figure 9:
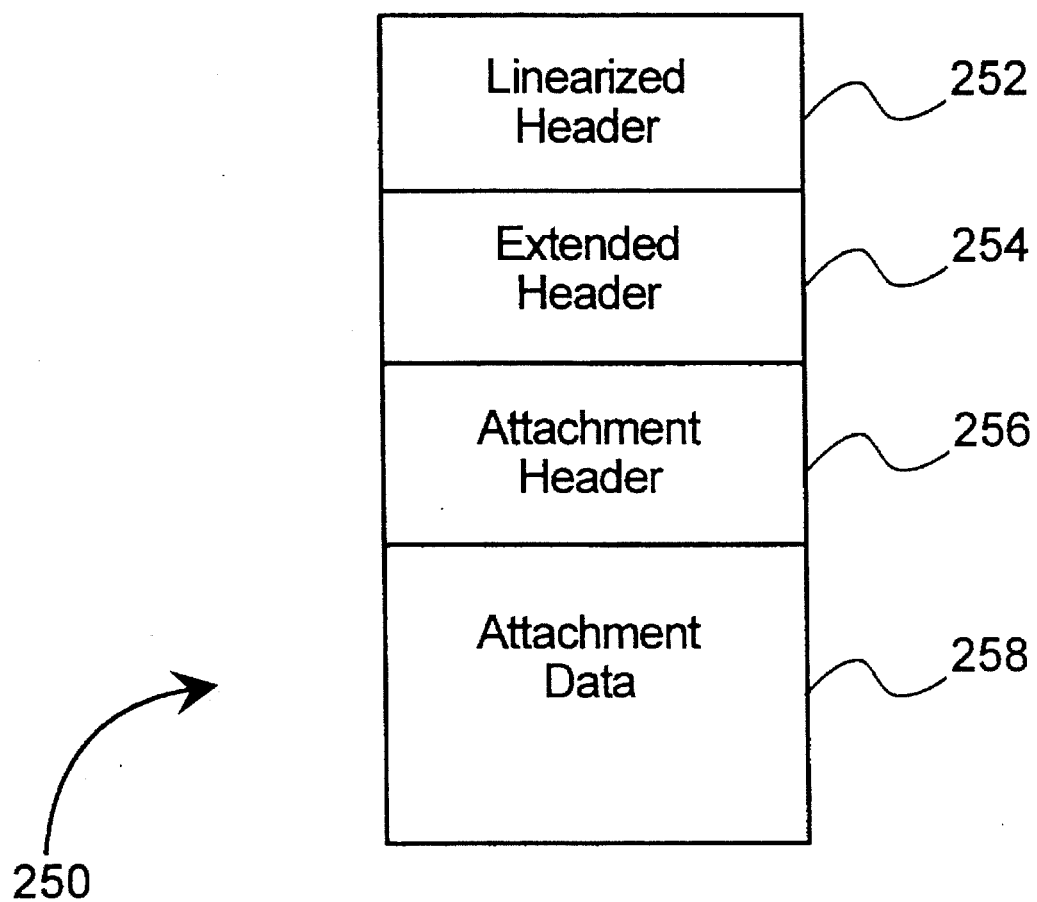
FIG. 9 illustrates a linearized message processed by the system of FIG. 2.

The basic structure of a linearized message is shown in FIG. 9. A linearized message 250 contains four parts. The first part is a linear header 252 that is defined in the system 10 using a simple C-programming language data structure. The structure of the linear header 252 is shown in Table below.

TABLE 8

Linear Header Structure

```
typedef struct    {
        WORD      uHeaderSize;
        WORD      uTotalSize;
        WORD      uMsgType;
        WORD      uFlags;
        WORD      uNumRecipients;
        WORD      rguRecipTypes[];
}   LINHEADER;
Members uHeaderSize
            Size of this header in bytes.
         uTotalSize
            Total size occupied by this header.
         uMsgType
            Can be any of the following.
            LINMSG_SEND
               Normal send message. Message must contain sender information and at
               least one recipient.
            LINMSG_POLLREQ_ADDRESS
               Polls for a document for a particular address. Extended header must
               contain sender information, the address for which messages are desired
               (as the Pollname), and the password decided upon.
            LINMSG_POLLREQ_FILE
               Polls for a directory/file on the recipient system. Extended header must
               contain sender information, the file system path to be accessed (as the
               Pollname), and the password decided upon.
            LINMSG_POLLREQ_MSGNAME
               Polls for a particular message name. Extended header must contain
               sender information, the message name wanted (as the Pollname), and the
               password decided upon.
            LINMSG_POLLREQ_G3
               Standard G3 compliant poll request. Polls for any file which has been
               stored at the recipient machine. Neither of pollname or password are
               required.
            LINMSG_RELAYREQ
               This is a request to send a relay message. If password validation is
               required, the extended header may contain a password.
```

TABLE 8-continued

Linear Header Structure uFlags
    Can be a combination of any of the following:
    LIN_ENCRYPTED
        Indicates that the message data is encrypted.
    LIN_IMAGE_ONLY
        Indicates that the message data contains rendered images only.
    LIN_RAWDATA_ONLY
        Indicates that the message data portion consists of raw unframed data. If
        this flag is set, the extended header must contain the description for this
        data. This Flag is *NEVER* set for data on the wire. It is only meant to
        allow more efficient exchange of data between the client and the
        transport.
uNumRecipients
    Tells the number of recipients this message is intended for. Also indicates the
    size of the rguRecipTypes[]array.
    An array of size uNumRecipients each element of which indicates what kind
    of operations the receiving system needs to perform for this recipient. The
    sending machine needs to update these types before sending an instance of
    this message to any recipient (see the example below). All other detailed
    information about the recipients are in the extended header. The different
    types are:
    RECIP_DISPLAY
        This instance of the message is not intended for this recipient.
        Information is provided for display purposes only.
    RECIP_LOCAL
        The recipient is local to the receiving machine.
    RECIP_RELAY
        The recipient has to be reached via a series of relay points. The
        uHopIndex field in the extended header pts to the current hop if the
        receiver is a relay pt. The uHopIndex field forms a linked list of all the
        remaining hops.
    RECIP_RELAYPOINT
        This is a relay point for one of the relay recipients. The msg password
        and params specify the relay password and options if any.
        NextHopIndex specifies the next relay point if any in this route.

The data structure of the linear header 252 is located at offset 0 of the message 250. The linear header 252 is needed to be accessed at several points to set the message types appropriately to enable the system 10 to use the linearized message marking function previously described. Typically, the format would be created once for the linearized message 250, and then as the linearized message is sent to each recipient, the system 10 marks that recipient type as LOCAL and marks all others as DISPLAY. For example, suppose a message has two recipients A and B, each at different machines (phone numbers). When sending to the recipient A, the recipient types should be marked as Recipient A: RECIP_LOCAL and Recipient B: RECIP_DISPLAY. When sending to the recipient B, the recipient types should be marked as Recipient A: RECIP_DISPLAY and Recipient B: RECIP_LOCAL. The use of the C-programming language data structure starting at offset 0 allows this to be done efficiently.

The message formatter/linearizer 34 encodes the message object 204 as having a set of properties, a list of zero or more attachments, and a list of zero or more recipients. Each property consists of a Property-ID, a Property-Type, and a Property Value. The Property-ID identifies the particular data field. A Property-Type identifies the type of data that may be contained in a field containing the actual data conforming to the Property-Type. One example of a message property is the message subject. In this example, the Property-ID is a numeric value identifying the message property as a message subject. Property-Type is a string, and the Property Value is the string data representing the subject for the particular message.

The message formatter/linearizer 34 encodes each attachment, stored in the data heads storage area 202, as a set of properties. An attachment is a data file, such as a word processing document, that is attached to the linearized facsimile message. The data header, which may be called an attachment header is stored in the data header storage area 202 and is itself a set of properties. One example of an attachment property is the data type of the attachment. In this case, the Property-ID is a numeric value identifying the attachment property as the data type, the Property Type is an integer, and the Property Value may be a numeric value identifying the data as a word processing document. One of the properties of the attachment header in the data header storage area 202 points to the location of the word processing data file in the data file storage area 200. The message formatter/linearizer 34 also encodes each recipient object as a set of properties. One of the properties describes the type of recipient. A recipient can be a direct addressee of the linearized facsimile message, or could be indirectly addressed through one or more relay points, or could be a description of a relay point itself. One example of a recipient property is the facsimile telephone number of the recipient. The Property-ID is a numeric value identifying the recipient property as a recipient facsimile telephone number, the Property-Type is a string, and the Property Value is the string representing the recipient facsimile telephone number.

The message type field, uMsgType, in Table 8, indicates the type of message sent. The set of properties contained in a message depend on the message type. The system 10 defines certain message types. Message objects of a message type are distinguished by properties or property values unique to the type, and by the actions that are taken in response to the receipt of a message object of the type. For each message type, the system 10 defines certain standard properties for each object used in that message-type. These properties contain the "real" (user-level) information content of the message object. For each message type, the system 10 also defines the specific actions that must be taken upon receipt of a message object of that type. Some properties may not be supported by all implementations, i.e., they may not all take the actions required by the property, but are still "standard" in that their meaning when support is well-defined.

There are a variety of message types, each with a set of standard properties. The first message type is a standard interpersonal send message (uMsg type LINMSG_SEND in Table 8). This is a send message addressed to one or more recipients and can contain text and zero or more attachments. In this case, the linearized message 250 typically contains a message subject and one or more recipient descriptions.

Poll request messages are another category of message types. A poll-request message is created to request specific data from a remote station. The message properties specify what data is requested along with passwords if necessary. If successful, a standard message, LINMSG_SEND, is returned in response to the poll request message.

There are four message types associated with poll requests.

1. LINMSG_POLLREQ_MSGNAME: A user can create a message, but can, instead of addressing it, the user can give it a name and an optional password and leave it available for polling. Callers can retrieve this message by message-name and password, if any. The message remains stored within the transmitting FAX machine until explicitly deleted.

2. LINMSG_POLLREQ_ADDRESS: A user can create a message and address it to one or more recipients or distribution lists, but instead of submitting it for sending, the user can mark it "for pickup", and supply an optional password. Callers can retrieve this message by recipient-address and password, if any. The message is deleted when it has been successfully retrieved by all addressees (exactly the same behavior as messages submitted for sending).

3. LINMSG_POLLREQ_G3: A user can create a message, and leave it for message polling, but leave it both unaddressed and unnamed, for public/blind polling. There can be at most one such message outstanding at a time. Callers can retrieve this message by asking for the public-poll message.

4. LINMSG_POLLREQ_FILE: When enabled, this allows a remote user, after proper authentication, to browse and retrieve arbitrary files on disk.

The second part of the linearized message 250 is an extended header 254. The extended header 254 includes such information as the message subject, recipient address information, sender address information, polling names, and the like. The extended header 254 for a poll message may contain the poll name data field and the password data field. The extended header 254 for a poll message typically does not contain a subject, and is usually addressed to only a single recipient.

The extended header 254 contains many variable length data fields. Because of the potential size of the data fields, the C-programming language data structure used for the linear header 252 would require the processing of large portions of the memory 22 (see FIG. 2). Instead of the C-programming language data structure, the system 10 uses a CCITT standard encoding procedure for processing the extended header 254. The CCITT process, known as ASN-1 encoding, is capable of one pass processing of variable length data fields. Each data field is processed by CCITT ASN-1 encoding, which means that each field is tagged with a type and a length, followed by the value. The use of ASN-1 encoding and decoding is well known in the art, and will not be described herein. There are a number of data fields that can be part of the extended header 254. The data fields present in the extended header 254 depends on the message type. A list of possible data fields for the extended header 254 is shown in Table 9 below.

TABLE 9

HDRTAG_SUBJECT
    As ASCII string containing the subject of the message.
    Used by the cover page renderer.
HDRTAG_POLLNAME
    An ASCII string containing the name of the object being
    polled for if the message type if
    LINMSG_POLLREQ_ADDRESS,
    LINMSG_PLLREQ_FILE,
    LINMSG_POLLREQ_MSGNAME.
HDRTAG_PASSWORD
    A password string to be associated with the message.
    This would typically be valid for poll requests or relay
    request messages.
HDRTAG_FROM
    A Linearized Header Recipient structure giving details
    about the originator of the message.
HDRTAG_TO
    An array of Linearized Header Recipient structures giving
    details for all recipients on the TO list of the message.
HDRTAG_CC
    An array of Linearized Header Recipient structures
    giving details for all recipients on the CC list of
    the message.
HDRTAG_BCC
    An array of Linearized Header Recipient structures giving
    details for all recipients on the BCC list
    of the message.
HDRTAG_RAWATTACH
    If the LIN_RAWDATA_ONLY flag is set in the
    uFlags field of the header, then this field contains a
    Linearized Header Raw Data structure describing this data.

To allow an existing image format to be efficiently packaged according to the linearized format, the extended header 254 provides a raw data attach data field, HDRTAG_RAWATTACH. The type of the image data can be encoded in this date field using the linearized raw data structures described in Table 10. The linearized fore, at in this case consists of the extended header 254 followed by the raw data.

TABLE 10

ATTTAG_TYPE
    A word describing the type of data being attached.

In addition to a data field relating to raw data, the extended header 254 may contain several optional data fields containing message recipient data. This may include information about a message recipients facsimile telephone number, physical address, company name, and the like. The extended header 254 will contain data fields for each recipient. The data fields are ASN-1 encoded, and as with the other header information may comprise several optional data fields. The message recipient data fields are shown in Table 11 below.

TABLE 11

RECIPTAG_VOICEPHONE
    String containing the voice phone number for

TABLE 11-continued the recipient if any.
RECIPTAG_LOCATION1
    String containing the first line of the recipients
    physical routing address (e.g., Company Name).
RECIPTAG_LOCATION2
    String containing a second line of the recipients
    physical routing address (e.g., Microsoft Way).
RECIPTAG_LOCATION3
    String containing a third line of the recipient's physical
    routing address (e.g., Redmond, Washington 98052).
RECIPTAG_FRIENDLYNAME
    String containing the friendly name for the recipient (as you
    want displayed on the cover page).
RECIPTAG_ADDRESS
    String containing the At Work address for the recipient
    (e.g., BillS@+1-206-5551234).
RECIPTAG_ALTADDRESS
    Alternate At Work address for the recipient.
RECIPTAG_PASSWORD
    If the recipient is of type RECIP_RELAYPOINT this
    contains a password to validate use of this station as
    a relay point.
RECIP_PARAMS
    If the recipient is of type RECIP_RELAYPOINT
    this contains any parameters for this point (e.g.,
    Send at cheap times).
RECIPTAG_NEXTHOPINDEX
    Used if the recipient is of type RECIP_RELAY. It
    indicates the index of the next hope for this
    relay message. This field essentially creates linked
    list of recipient relay points for routing of the message.

The system 10 secures the linear header 252 and the extended header 254 from forger as follows. Obtain two cryptographically secure hash functions HF1 and HF2, such that HF1 takes an arbitrary input stream and outputs H1 with length HL1, and HF2 takes an arbitrary input stream and outputs H2 with length HL2, such that HL1 is not less than HL2. Also obtain an encryption function EF1 such that EF1 can take as input data of length HL1 and encrypt it with a key of size HL2, returning output E1 of length HL1. Also obtain a function CF1 which takes two packets of length HL2, and returns a a single packet of length HL2, which contains bits derived from both input packets. CF1 should operate in two modes. In the first mode, M1, it chooses some random bits R1 of size RL1 to also mix into the output, returning those bits chosen as a second output. In the second mode of operation, M2, it should take R1 of length RL1 bits as an extra input, and use those bits to mix into the output in the same way as mode M1 uses the randomly chosen bits. Finally, choose a secret key, S1, of length HL2.

To secure the linear header 252 and the extended header 254, the system 10 first applies has functions HF1 and HF2, yielding H1 and H2. The system 10 then takes H2 and secret key S1, and use them as inputs to CF1 in mode M1, yielding a secret key S2 and random bits R1. The system 10 then encrypts H1 with function EF1 under key S2, yielding E1 of length HL1. Finally, the system 10 appends both R1 and E1 to the original linear header. Now the linear header 252 and the extended header 254 are said to be secure.

In order to verify the linear header 252 and the extended header 254, the system 10 first applies has functions HF1 and HF2 to the original part of the linear header 252 (up to where the signature data R1 and E1 have been appended), yielding H1 and H2. The system 10 takes H2 and R1 (from the appended part of the linear header 252), along with S1, and calculates S2 using EF1 in mode M2. The system 10 encrypts H1 with function EF1 under key S2, yielding E1 of length HL1. The system 10 then compares this E1 with the E1 from the appended part of the header. If they match, the linear header 252 and the extended header 254 are validly signed. If they are different, either the linear header 252 or the extended header 254, or both, have been forged.

The third part of the linearized message 250 is an attachment header 256. The attachment headers 256 are always linearized before the data properties to allow the receiving FAX machine to know what to do with the data properties before the data properties are received. The attachment header 256 also contains any message properties not previously included. The attachment header 256 does not exist for poll request messages because they do not have attachments. A list of sample attachment header properties is shown in Table 12 below.

TABLE 12

Attachment Header Properties

| | | |
|---|---|---|
| TAG_ATT_TYPE | Long | //Type of data |
| TAG_ATT_FLAGS | Long | //Flags - signed or not |
| TAG_ATT_POSITION | Long | //position for display in the body of the message |
| TAG_ATT_RENDSIZE | Long | //Size of rendered versions for display in the //message |
| TAG_ATT_CREATEDATE | Date | //Date created if its a file |
| TAG_ATT_MODIFYDATE | Date | //Date last modified if its a file |
| TAG_ATT_DISPNAME | String | //Display name |
| TAG_ATT_PARAMS | String | //Other data type dependent parameters //(e.g., resolution if data type is rendered image) |

A list of sample message properties is shown below in Table. 13.

TABLE 13

Message Properties

| Property Name | Property Type | Comment |
|---|---|---|
| PR_PRIORITY | ULONG | Message priority (0=normal, 1=nonurgent, 2=urgent). May be used by implementation for |

TABLE 13-continued

Message Properties

| Property Name | Property Type | Comment |
| --- | --- | --- |
| PR_SENSITIVITY | ULONG | scheduling decisions<br>Sensitivity of the message.<br>Personal=1, Private=2, Company-Confidential=3<br>May be used by implementation for security decisions |
| PR_SUBJECT | String | Subject of message. |
| PR_DISPLAY_TO | String | List of TO: recipients which is displayed. This is a semicolon delimited list of the display names. Note that semicolons are illegal in display names. |
| PR_DISPLAY_CC | String | List of CC: recipients which is displayed. See PR_DISPLAY_TO for details. |
| PR_DISPLAY_BCC | String | List of BCC: recipients which is displayed. See PR_DISPLAY_TO for details. |
| PR_CONVERSATION_ID | GUID | An ID used for conversation tracking. Messages belonging to the same series of messages have the same PR_CONVERSATION_ID. An IPM application copies the PR_CONVERSATION_ID of the original message when replying or forwarding a message. An IPM application copies the PR_MESSAGE_ID field to the PR_CONVERSATION_ID when creating a new message. |
| uNumPages | ULONG | Number of pages in a published (image) message. |
| PR_ICON | Binary | Icon associated with the message. This icon, if present, is typically used when the message is minimized. |
| PR_EXPIRATION | Date-Time | Expiration date/time. If not delivered by this time, the message is to be discarded. |
| PR_ALTERNATE_RECIPIENT_ALLOWED | Boolean | If FALSE, disallow forwarding of message if requested. |
| PR_READ_RECEIPT_REQUESTED | Boolean | Indicates that a read report should be returned when the recipient of the message reads it. |
| PR_ORIGINATOR_DELIVERY_REPORT_REQUESTED | Boolean | Indicates that a report should be returned when the message is delivered to the final recipient (not necessarily read). |

The fourth part of the linearized message 250 is an attachment data 258. The attachment data 258 is placed in the selected transfer form discussed above. The formatter/linearizer 34 (see FIG. 2) uses ASN-1 encoding on the transfer form of the attachment data 258 to encode the transfer form. To secure sensitive messages and reduce transmission time, the attachment header 256 and the attachment data 258 can be encrypted and/or compressed. The linear header 252 and extended header 254 are not encrypted so as to allow the receiving FAX machine to appropriately route the received facsimile message. The encryption and data compression can use any number of well known encryption and compression routines.

All of the properties shown in the examples above are defined in the current embodiment of the linearized format. However, it should be appreciated that the format of the present invention is designed to permit the addition of new properties as needed in future revisions. During the process of delinearization, the linearizer/formatter 34 discards any properties that it does not recognize. For example, if a new property related to additional relay parameters is introduced at a later date, this information can be included in the linearized format and utilized by any system 10 having the ability to process the additional relay parameters. However, the system 10 can still communicate with systems having previous versions of the linearizer. The system 10 having earlier versions of the linearized format will ignore any properties that it does not recognize. Similarly, if new polling types are introduced, they can be implemented without affecting communications with existing implementations. This allows great flexibility and extensibility for new features in the future while still maintaining backward compatibility.

The linearized message 250 is sent from the transmitting FAX machine to the receiving FAX machine in the sequence described above (i.e., linear header 252, extended header 254, attachment header 256, and attachment data 258. This permits the receiving FAX machine to interpret portions of the linearized massage 250 as they are received, and to prepare for the proper processing of the remainder of the linearized message. For example, the receiving FAX machine knows the message types because of header information. Thus, the receiving FAX machine will be prepared to process the particular type (or types) when the attachment data 258 appears at the receiving FAX machine.

Figure 10:
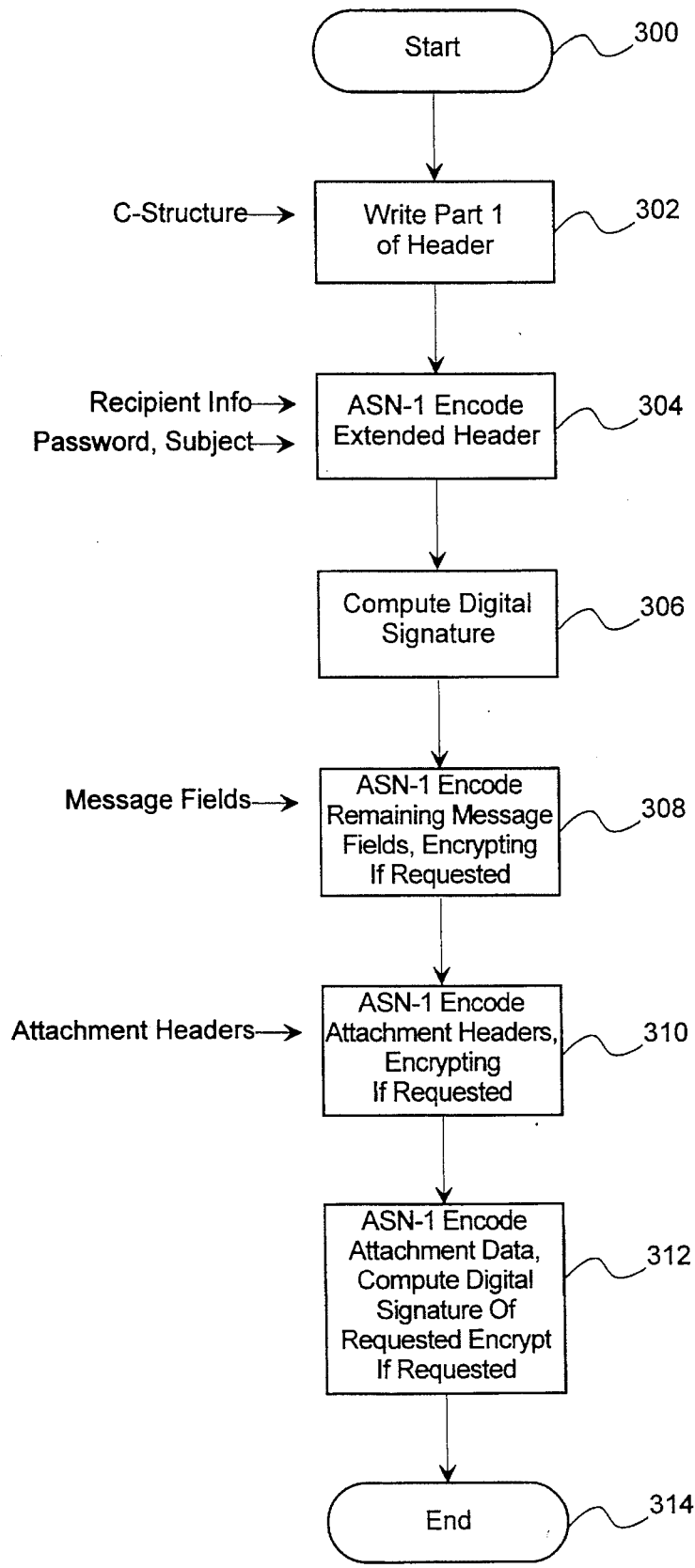
FIG. 10 is a flowchart of the linearization process performed by the system of FIG. 2.

The linearization process used by the system 10 is shown in FIG. 10. At the start 300, the various components of the facsimile message are stored within the memory 22 (See FIG. 2). In step 302, the system 10 creates the linearized header 252 using the C-programming language structure previously described. In step 304 the system 10 performs an ASN-1 encoding of the extended header 254. As previously described, the extended header 254 contains recipient information, an optional password, and subject information. In step 306 the system 10 computes a digital signature. As previously described, the digital signature is used by the receiving FAX machine to determine the authenticity of the facsimile message. In step 308, the system 10 uses ASN-1 encoding for the remaining message fields including the attachment header 256 (see FIG. 9) and the attachment data 258. As discussed above, the system 10 may encrypt the message fields if requested by the user. In step 310, the system 10 uses ASN-1 encoding for the attachment headers. As with the message field, the attachment headers may also be encrypted if requested by the user. In step 312, the system 10 encodes attachment data using ASN-1 encoding process previously described. The system 10 may also compute a digital signature if requested by the user and may additionally encrypt the data if requested by the user. The system ends the linearization process in step 314.

Figure 11:
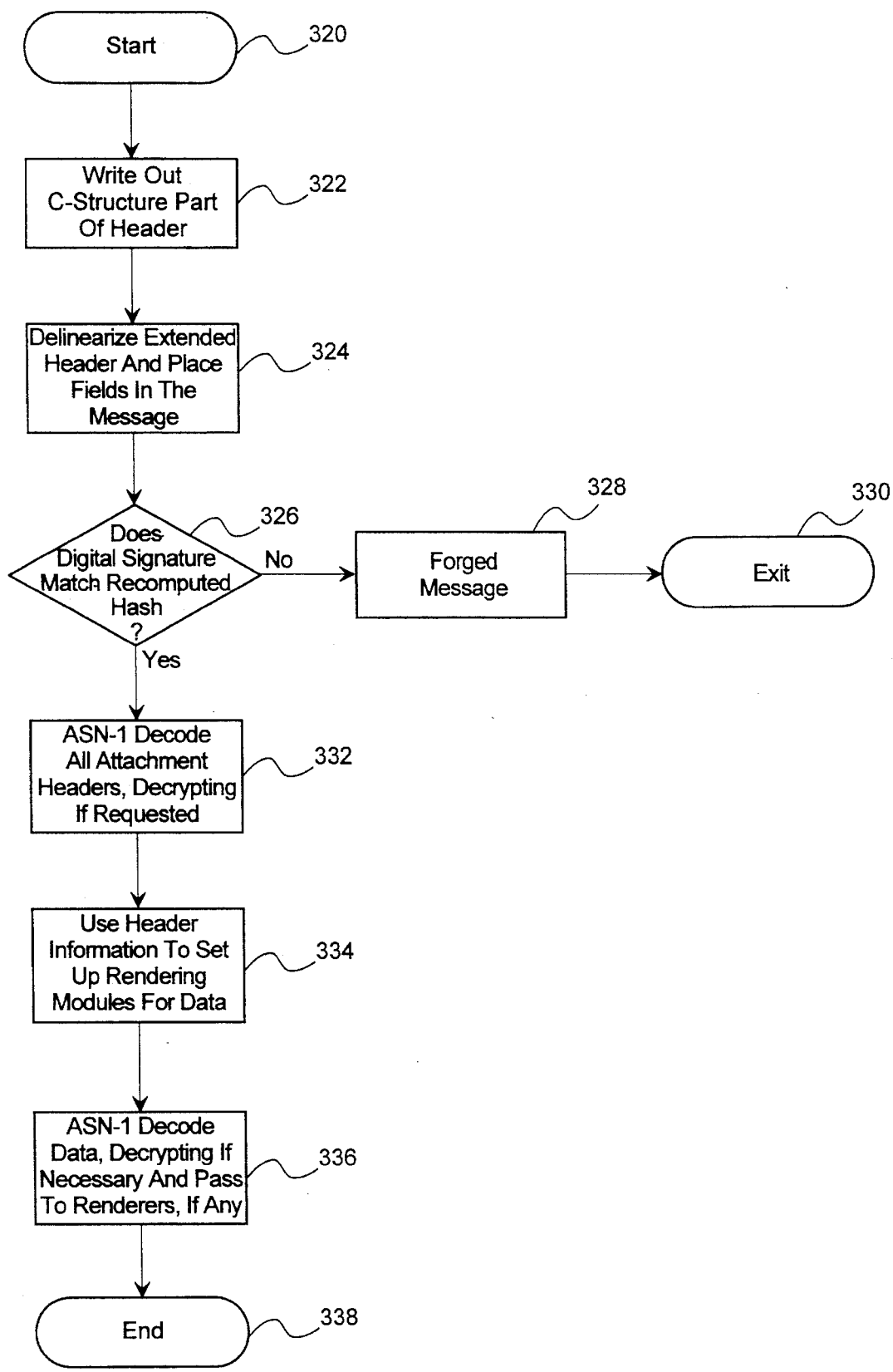
FIG. 11 is a flowchart of the delinearization process performed by the system of FIG. 2.

The delinearization process is shown in the flowchart of FIG. 11. At the start 320 the receiving FAX machine has received the linearized message. In step 322, the system 20 writes out the C-programming language structure portion of the header. In step 324, the system 10 delinearizes the extended header and creates fields in the message. In decision 326, the system 10 determines whether the digital signature matches a recomputed hash digital signature. If the digital signature does not match the recomputed hash, the result of decision 326 is NO. In that event, the system 10 in step 328, determines that the received facsimile message is a forged message and in step 330, the system 10 exits the delinearization process.

If the digital signature does match the recomputed hash, the result of decision 326 is YES. In that event, in step 332 the system 10 performs an ASN-1 decoding on all attachment headers. If the attachment headers were encrypted prior to transmission, the system 10 decrypts the attachment headers. In step 334, the system 10 uses the header information to set up parameters for the rendering modules for the data. As is well known in the art, the type of rendering module required depends on the type of data to be processed. For example, if the data comprises a Microsoft® Word document, the system 10 passes parameters to the operating system in the receiving FAX machine to indicate that the Microsoft® Word document must be processed by the appropriate data processing capability within the receiving FAX machine. This enables the receiving FAX machine to determine a location in which the Microsoft® Word data will be placed. Other data files may be transmitted as a bit map or image and require no additional rendering within the receiving FAX machine. In step 336, the system 10 performs an ASN-1 decoding of the data. The system 10 also decrypts the data if it was previously encrypted. Following the ASN-1 decoding, and decrypting if necessary, the system 10 passes the decoded data file to any required renderers. The system 10 ends the delinearization process in step 338.

Thus, the system 10 processes the data in a manner that efficiently uses the data processing capabilities of the sending and receiving FAX machines, and linearizes the data in a manner that permits the efficient processing of the data. The linearization process also permits greater flexibility in the routing of facsimile messages to multiple recipients by explicitly including recipient data in the extended header 254 rather than forcing the user to manually complete a facsimile cover sheet with the message recipient's name, number and routing information. The system 10 is a powerful communication system that allows more efficient transfer of information than was possible with systems of the prior art. The examples presented herein relate to facsimile communication. However, it should be noted that the principles of capabilities exchange are applicable to communication between any computers.

It is to be understood that even though various embodiments and advantages of the present invention have been set forth in the foregoing description, the above disclosure is illustrative only, and changes may be made in detail, yet remain within the broad principles of the invention. Therefore, the present invention is to be limited only by the appended claims.

What is claimed is:

1. A system for controlling communication between first and second facsimile machines, the system comprising:

a formatter to generate formatted data according to a predetermined format comprising a message object having a plurality of data headers and corresponding data attachments, each of said data headers containing header data describing said corresponding data attachments; and a controller controlling transfer of said formatted data from the first facsimile machine to the second facsimile machine, said controller transferring said plurality of data headers prior to transferring any of said corresponding data attachments.

2. The system of claim 1 wherein each of said plurality of data headers contains a plurality of header data fields, and said plurality of header data fields comprises one of a header size data field indicating the size of said data header, a message type data field indicating the type of data being transferred in said corresponding data attachment, a recipient number data field indicating the number of intended recipients of said formatted data, and a recipient type data field indicating recipient parameters.

3. The system of claim 2 wherein said plurality of header data fields includes a flag data field indicating the presence of encrypted data in said formatted data.

4. The system of claim 2 wherein said plurality of header data fields includes a flag data field indicating the presence of image map data in said formatted data.

5. The system of claim 1 wherein said predetermined format includes an extended header for providing detailed recipient information about an intended recipient of said formatted data.

6. The system of claim 5 wherein said extended header contains at least a first data field, said extended header data field comprising one of a subject data field containing information relating to the subject of said formatted data, a poll name data field indicating a filename if one of the first and second facsimile machines is sending a poll request, a password data field containing an authorized user identification, and a message originator data field containing data indicating the identity of the sender of said formatted data.

7. The system of claim 5 wherein said formatted data is transferred to at least a first recipient, said extended header containing a message recipient data field containing data indicating a list of all recipients of said message.

8. The system of claim 7 wherein said message recipient data field comprises a recipient name, and a recipient address.

9. The system of claim 1 wherein the second facsimile machine receives said data headers prior to receiving said corresponding data attachments and uses said data headers to prepare in advance of receiving said corresponding data attachments for processing said corresponding data attachments.

10. The system of claim 1 wherein said formatter generates said formatted data in a linearized format having a linearized sequence indicative of a transfer sequence in which said controller will transfer said formatted data.

11. The system of claim 10 wherein said linearized sequence includes a routing header containing data indicative of a transmission path from the first facsimile machine to the second facsimile machine, a recipient header containing data indicative of an intended recipient of said formatted data, said data headers, and said corresponding data attachments.

12. A system for controlling communication between first and second computers, the system comprising:

a formatter to generate formatted data according to a predetermined linearized format indicative of a sequence in which said formatted data will be transferred from the first computer to tile second computer, said linearized format comprising an unsigned and unencrypted linear header containing routing data indicative of a transfer path from the first computer to the second computer, an extended header containing data indicative of an intended recipient of said formatted data, said extended header containing a digital signature to permit detection of alterations to said extended header, at least a first attachment data block containing information to be transferred from tile first computer to the second computer, and an attachment header corresponding to each attachment data block and containing data related to a type of processing to be performed on said corresponding attachment data block by the second computer; and a controller controlling transfer of said formatted data from the first computer to the second computer.

13. The system of claim 12 wherein said linear header contains a data field containing a plurality of flags, said flags being used by said linearizer to describe said parameters.

14. The system of claim 13 wherein one of said plurality of flags indicates the presence of encrypted data in said data.

15. The system of claim 13 wherein one of said plurality of flags indicates the presence of image data in said data.

16. The system of claim 12 wherein said linear header data field comprises a plurality of data fields comprising a size data field indicating the size of said linear header, a message type data field indicating the type of said data, a recipient number data field indicating the number of message recipients, and a recipient type data field indicating recipient parameters.

17. The system of claim 12 wherein said extended header contains at least a first data field, said first extended header data field comprising one of a subject data field containing information relating to the subject of said data, a poll name data field indicating a filename if one of the first and second computers is sending a poll request, a password data field containing an authorized user identification, and a message originator data field containing data indicating the identity of the sender of said data.

18. The system of claim 12 wherein said extended header contains a message recipient data field containing data indicating a list of all recipients of said formatted data.

19. The system of claim 18 wherein said message recipient data field comprises a recipient name, and a recipient address.

20. . The system of claim 12 wherein said attachment data block is encoded using ASN-1 encoding.

21. The system of claim 12 wherein said attachment data block is compressed before transmission to the second computer.

22. The system of claim 12 wherein said attachment data block is encrypted before transmission to the second computer.

23. The system of claim 12 wherein the second computer receives said attachment header prior to receiving said corresponding attachment data block and uses said attachment header to prepare in advance of receiving said corresponding data attachment block for processing said corresponding attachment data block.

24. The system of claim 12 wherein said formatted data is transferred to the second computer through a relay computer, said relay computer altering said linear header to indicate transfer through said relay computer.

25. The system of claim 12 wherein said type of processing to be performed by the second computer is printing said corresponding attachment data block.

26. The system of claim 12 wherein said recipient is the second computer and said type of processing to be performed by the second computer is storing said corresponding attachment data block.

27. The system of claim 12 wherein the first and second computers are first and second facsimile machines, respectively, and said type of processing to be performed by said second facsimile machine is a poll request, said corresponding attachment data block containing polling data.

28. The system of claim 27 wherein said polling data includes pathway data indicating the location of a selected data file stored within said second facsimile machine.

29. A method for controlling communication between first and second facsimile machines, the method comprising the steps of:

formatting data according to a predetermined format comprising a message object having a plurality of data headers and corresponding data attachments each of said headers containing header data describing said corresponding data attachment;

transferring said plurality of data headers from the first facsimile machine to the second facsimile machine; and after transferring all of said plurality of data headers, then transferring said corresponding data attachments from the first facsimile machine to the second facsimile machine.

30. The method of claim 29 wherein each of said plurality of data headers contains a plurality of data fields, and said plurality of header data fields comprises a header size data field indicating the size of said header, a message type data field indicating the type of said message, a recipient number data field indicating the number of intended message recipients of said message, and a recipient type data field indicating recipient parameters.

31. The method of claim 30 wherein said plurality of header data fields includes a flag data field indicating the presence of encrypted data in said formatted data.

32. The method of claim 30 wherein said plurality of header data fields includes a flag data field indicating the presence of image data in said formatted data.

33. The method of claim 29 wherein said predetermined format includes an extended header for providing detailed recipient information about an intended recipient of said formatted data.

34. The method of claim 33 wherein said extended header contains at least a first data field, said extended header data field comprising one of a subject data field containing information relating to the subject of said formatted data, a poll name data field indicating a filename if one of the first and second facsimile machines is sending a poll request, a password data field containing an authorized user identification, and a message originator data field containing data indicating the identity of the sender of said formatted data.

35. The method of claim 33 wherein said formatted data is transferred to at least a first intended recipient, said extended header containing a message recipient data field containing data indicating a list of all intended recipients of said formatted data.

36. The method of claim 35 wherein said message recipient data field comprises a recipient name, and a recipient address.

37. The method of claim 29 wherein said step of formatting generates formatted data in a linearized format having a linearized sequence indicative of a transfer sequence in which said controller will transfer said formatted data.

38. The method of claim 37 wherein said linearized sequence includes a routing header containing data indicative of a transmission path from the first facsimile machine to the second facsimile machine, a recipient header containing data indicative of an intended recipient of said formatted data, said data headers, and said corresponding data attachments.

39. A method for controlling communication between first and second computers, the method comprising the steps of:

generating an unsigned and unencrypted linear header containing routing data indicative of a transfer path from the first computer to the second computer:

generating an extended header containing data indicative of an intended recipient of said formatted data, said extended header containing a digital signature to permit detection of alterations to said extended header:

generating at least a first attachment data block containing information to be transferred from the first computer to the second computer;

generating an attachment header corresponding to each attachment data block and containing data related to a type of processing to be performed on said corresponding attachment data block by the second computer; and transferring said formatted data from the first computer to the second computer.

40. The method of claim 39 wherein said linear header contains a data field containing a plurality of flags to describe said parameters, said step of generating said linear header including the formatting of said flags.

41. The method of claim 40 wherein one of said plurality of flags indicates the presence of encrypted data in data.

42. The method of claim 40 wherein one of said plurality of flags indicates the presence of image data in the data.

43. The method of claim 39 wherein said linear header data field comprises a plurality of data fields comprising a size data field indicating the size of said linear header, a message type data field indicating the type of said formatted data, a recipient number data field indicating the number of message recipients, and a recipient type data field indicating recipient parameters.

44. The method of claim 39 wherein said extended header contains at least a first data field, said first extended header data field comprising one of a subject data field containing information relating to the subject of said formatted data, a poll name data field indicating a filename if one of the first and second computers is sending a poll request, a password data field containing an authorized user identification, and a message originator data field containing data indicating the identity of the sender of said formatted data.

45. The method of claim 39 wherein said extended header contains a message recipient data field containing data indicating a list of all recipients of said formatted data.

46. The method of claim 45 wherein said message recipient data field comprises a recipient name, and a recipient address.

47. The method of claim 39 wherein said attachment data block is encoded using ASN-1 encoding before transmission to the second computer.

48. The method of claim 39 wherein said attachment data block is compressed before transmission to the second computer.

49. The method of claim 39 wherein said attachment data block is encrypted before transmission to the second computer.

50. The method of claim 39 wherein the second computer receives said attachment header prior to receiving said corresponding attachment data block.

51. The method of claim 39 wherein said formatted data is transferred to the second computer through a relay computer, the method further including the step of altering said linear header to indicate transfer through said relay computer.

52. The method of claim 39 wherein said type of processing to be performed by the second computer is printing said corresponding attachment data block.

53. The method of claim 39 wherein said recipient is the second computer and said type of processing to be performed by the second computer is storing said corresponding attachment data block.

54. The method of claim 39 wherein the first and second computers are first and second facsimile machines, respectively, and said type of processing to be performed by said second facsimile machine is a poll request, said corresponding attachment data block containing polling data.

55. The method of claim 54 wherein said polling data includes pathway data indicating the location of a selected data file stored within said second facsimile machine.

* * * * *

UNITED STATES PATENT AND TRADEMARK OFFICE
CERTIFICATE OF CORRECTION

PATENT NO. : 5,473,691
DATED : December 5, 1995
INVENTOR(S) : Arul Menezes, Sharad Mathur and Michael Ginsberg It is certified that error appears in the above-indentified patent and that said Letters Patent is hereby corrected as shown below:

In column 33, claim 12, line 2, please delete "tile" and insert therefor--the--.

In column 33, claim 12, line 11, please delete "tile" and insert therefor--the--.

In column 35, claim 39, line 11, please delete ":" and insert therefor--;--.

In column 35, claim 39, line 15, please delete ":" and insert therefor--;--.

Signed and Sealed this

Twenty-fifth Day of June, 1996

Attest:

BRUCE LEHMAN

*Attesting Officer*  *Commissioner of Patents and Trademarks*